United States Patent
Lin et al.

(10) Patent No.: US 9,541,814 B2
(45) Date of Patent: Jan. 10, 2017

(54) COLOR DISPLAY DEVICE

(71) Applicant: E Ink California, LLC, Fremont, CA (US)

(72) Inventors: Craig Lin, Oakland, CA (US); Ming Wang, Fremont, CA (US); Hui Du, Milpitas, CA (US); Xiaojia Zhang, Fremont, CA (US); Yu Li, Fremont, CA (US); Roman Ivanov, Aurora, IL (US); Yajuan Chen, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 59 days.

(21) Appl. No.: 14/626,552

(22) Filed: Feb. 19, 2015

(65) Prior Publication Data

US 2015/0234250 A1 Aug. 20, 2015

Related U.S. Application Data

(60) Provisional application No. 61/941,680, filed on Feb. 19, 2014, provisional application No. 62/061,077, filed on Oct. 7, 2014.

(51) Int. Cl.
| | | |
|---|---|---|
| *G02F 1/167* | (2006.01) | |
| *G02F 1/133* | (2006.01) | |
| *G09G 3/34* | (2006.01) | |
| *G09G 3/20* | (2006.01) | |

(52) U.S. Cl.
CPC ........... *G02F 1/167* (2013.01); *G02F 1/13306* (2013.01); *G09G 3/2011* (2013.01); *G09G 3/344* (2013.01); *G02F 2001/1678* (2013.01); *G09G 3/2003* (2013.01); *G09G 2300/0452* (2013.01)

(58) Field of Classification Search
CPC ............. G02F 1/167; G02F 2001/1678; G02F 2001/1672; G02F 2001/1676; G09G 3/344
USPC .......................................... 345/107; 359/296
See application file for complete search history.

(56) References Cited

U.S. PATENT DOCUMENTS

| | | |
|---|---|---|
| 3,756,693 A | 9/1973 | Ota |
| 3,892,568 A | 7/1975 | Ota |
| 4,298,448 A | 11/1981 | Muller et al. |
| 5,378,574 A | 1/1995 | Winnik et al. |
| 5,980,719 A | 11/1999 | Cherukuri et al. |
| 6,198,809 B1 | 3/2001 | Disanto et al. |

(Continued)

FOREIGN PATENT DOCUMENTS

| | | |
|---|---|---|
| CN | 1705907 A | 12/2005 |
| CN | 101075063 | 11/2007 |

(Continued)

OTHER PUBLICATIONS

U.S. Appl. No. 14/921,265, filed Oct. 23, 2015, Craig Lin et al.

(Continued)

*Primary Examiner* — Koosha Sharifi-Tafreshi
(74) *Attorney, Agent, or Firm* — David J. Cole

(57) ABSTRACT

The present invention is directed to a color display device in which each pixel can display at least five high-quality color states, and an electrophoretic fluid for such an electrophoretic display. In one aspect, the different types of particles exhibit different levels of attraction force to display different color states. In another aspect, the different types of particles exhibit different levels of mobility in different driving voltage ranges to display different color states.

20 Claims, 26 Drawing Sheets

(56) References Cited

U.S. PATENT DOCUMENTS

| | | |
|---|---|---|
| 6,337,761 B1 | 1/2002 | Rogers et al. |
| 6,373,461 B1 | 4/2002 | Hasegawa et al. |
| 6,486,866 B1 | 11/2002 | Kuwahara et al. |
| 6,517,618 B2 | 2/2003 | Foucher et al. |
| 6,525,866 B1 | 2/2003 | Lin et al. |
| 6,538,801 B2 | 3/2003 | Jacobson et al. |
| 6,600,534 B1 | 7/2003 | Tanaka et al. |
| 6,650,462 B2 | 11/2003 | Katase |
| 6,680,726 B2 | 1/2004 | Gordon et al. |
| 6,693,620 B1 | 2/2004 | Herb et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,751,007 B2 | 6/2004 | Liang et al. |
| 6,751,008 B2 | 6/2004 | Liang et al. |
| 6,781,745 B2 | 8/2004 | Chung et al. |
| 6,829,078 B2 | 12/2004 | Liang et al. |
| 6,850,357 B2 | 2/2005 | Kaneko et al. |
| 6,864,875 B2 | 3/2005 | Drzaic et al. |
| 6,876,486 B2 | 4/2005 | Hiraoka et al. |
| 6,930,818 B1 | 8/2005 | Liang et al. |
| 6,947,203 B2 | 9/2005 | Kanbe |
| 6,967,762 B2 | 11/2005 | Machida et al. |
| 6,987,503 B2 | 1/2006 | Inoue |
| 6,987,605 B2 | 1/2006 | Liang et al. |
| 7,009,756 B2 | 3/2006 | Kishi et al. |
| 7,019,889 B2 | 3/2006 | Katase |
| 7,034,987 B2 | 4/2006 | Schlangen |
| 7,038,655 B2 | 5/2006 | Herb et al. |
| 7,038,670 B2 | 5/2006 | Liang et al. |
| 7,046,228 B2 | 5/2006 | Liang et al. |
| 7,050,218 B2 | 5/2006 | Kanbe |
| 7,057,600 B2 | 6/2006 | Goden |
| 7,057,798 B2 | 6/2006 | Ukigaya |
| 7,075,502 B1 | 7/2006 | Drzaic et al. |
| 7,116,466 B2 | 10/2006 | Whitesides et al. |
| 7,226,550 B2 | 6/2007 | Hou et al. |
| 7,259,744 B2 | 8/2007 | Arango et al. |
| 7,271,947 B2 | 9/2007 | Liang et al. |
| 7,283,119 B2 | 10/2007 | Kishi |
| 7,292,386 B2 | 11/2007 | Kanbe |
| 7,303,818 B2 | 12/2007 | Minami |
| 7,312,916 B2 | 12/2007 | Pullen et al. |
| 7,342,556 B2 | 3/2008 | Oue et al. |
| 7,345,810 B2 | 3/2008 | Chopra et al. |
| 7,352,353 B2 | 4/2008 | Albert et al. |
| 7,365,732 B2 | 4/2008 | Matsuda et al. |
| 7,382,351 B2 | 6/2008 | Kishi |
| 7,382,521 B2 | 6/2008 | Chopra et al. |
| 7,411,719 B2 | 8/2008 | Paolini et al. |
| 7,417,787 B2 | 8/2008 | Chopra et al. |
| 7,420,549 B2 | 9/2008 | Jacobson et al. |
| 7,433,113 B2 | 10/2008 | Chopra et al. |
| 7,474,295 B2 | 1/2009 | Matsuda |
| 7,492,505 B2 | 2/2009 | Liang et al. |
| 7,495,821 B2 | 2/2009 | Yamakita et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,580,025 B2 | 8/2009 | Nakai et al. |
| 7,605,972 B2 | 10/2009 | Kawai et al. |
| 7,609,435 B2 | 10/2009 | Moriyama et al. |
| 7,626,185 B2 | 12/2009 | Krak et al. |
| 7,636,076 B2 | 12/2009 | Hung et al. |
| 7,652,656 B2 | 1/2010 | Chopra et al. |
| 7,656,576 B2 | 2/2010 | Suwabe et al. |
| 7,679,599 B2 | 3/2010 | Kawai |
| 7,686,463 B2 | 3/2010 | Goto |
| 7,760,419 B2 | 7/2010 | Lee |
| 7,782,292 B2 | 8/2010 | Miyasaka et al. |
| 7,808,696 B2 | 10/2010 | Lee et al. |
| 7,830,592 B1 | 11/2010 | Sprague et al. |
| 7,848,009 B2 | 12/2010 | Machida et al. |
| 7,852,547 B2 | 12/2010 | Kim |
| 7,852,548 B2 | 12/2010 | Roh |
| 7,907,327 B2 | 3/2011 | Jang et al. |
| 7,911,681 B2 | 3/2011 | Ikegami et al. |
| 7,982,941 B2 | 7/2011 | Lin et al. |
| 8,040,594 B2 | 10/2011 | Paolini et al. |
| 8,054,288 B2 | 11/2011 | Sugita et al. |
| 8,067,305 B2 | 11/2011 | Zafiropoulo et al. |
| 8,068,090 B2 | 11/2011 | Machida et al. |
| 8,072,674 B2 | 12/2011 | Wang et al. |
| 8,072,675 B2 | 12/2011 | Lin et al. |
| 8,081,375 B2 | 12/2011 | Komatsu et al. |
| 8,089,686 B2 | 1/2012 | Addington et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,164,823 B2 | 4/2012 | Ikegami et al. |
| 8,169,690 B2 | 5/2012 | Lin et al. |
| 8,174,491 B2 | 5/2012 | Machida et al. |
| 8,174,492 B2 | 5/2012 | Kim et al. |
| 8,237,892 B1 | 8/2012 | Sprague et al. |
| 8,243,013 B1 | 8/2012 | Sprague et al. |
| 8,355,196 B2 | 1/2013 | Yan et al. |
| 8,395,836 B2 | 3/2013 | Lin et al. |
| 8,422,116 B2 | 4/2013 | Sprague et al. |
| 8,441,713 B2 | 5/2013 | Kawashima et al. |
| 8,441,714 B2 | 5/2013 | Paolini et al. |
| 8,466,852 B2 | 6/2013 | Drzaic et al. |
| 8,477,404 B2 | 7/2013 | Moriyama et al. |
| 8,477,405 B2 | 7/2013 | Ishii et al. |
| 8,491,767 B2 | 7/2013 | Gibson et al. |
| 8,503,063 B2 | 8/2013 | Sprague |
| 8,520,296 B2 | 8/2013 | Wang et al. |
| 8,537,104 B2 | 9/2013 | Markvoort et al. |
| 8,565,522 B2 | 10/2013 | Swic |
| 8,570,272 B2 | 10/2013 | Hsieh et al. |
| 8,570,639 B2 | 10/2013 | Masuzawa et al. |
| 8,574,937 B2 | 11/2013 | Shi |
| 8,605,354 B2 | 12/2013 | Zhang et al. |
| 8,610,998 B2 | 12/2013 | Baisch et al. |
| 8,629,832 B2 | 1/2014 | Tanabe |
| 8,649,084 B2 | 2/2014 | Wang et al. |
| 8,670,174 B2 | 3/2014 | Sprague et al. |
| 8,674,978 B2 | 3/2014 | Komatsu et al. |
| 8,681,191 B2 | 3/2014 | Yang et al. |
| 8,687,265 B2 | 4/2014 | Ahn et al. |
| 8,704,754 B2 | 4/2014 | Machida et al. |
| 8,704,756 B2 | 4/2014 | Lin |
| 8,717,662 B2 | 5/2014 | Komatsu |
| 8,717,664 B2 | 5/2014 | Wang et al. |
| 8,786,935 B2 | 7/2014 | Sprague |
| 8,797,258 B2 | 8/2014 | Sprague |
| 8,797,636 B2 | 8/2014 | Yang et al. |
| 8,797,637 B2 | 8/2014 | Fujishiro et al. |
| 8,810,899 B2 | 8/2014 | Sprague et al. |
| 8,902,491 B2 | 12/2014 | Wang et al. |
| 8,917,439 B2 | 12/2014 | Wang et al. |
| 8,963,903 B2 | 2/2015 | Sakamoto et al. |
| 8,964,282 B2 | 2/2015 | Wang et al. |
| 8,988,764 B2 | 3/2015 | Abe et al. |
| 9,013,516 B2 | 4/2015 | Sakamoto et al. |
| 2001/0035926 A1 | 11/2001 | Yamaguchi et al. |
| 2004/0085619 A1 | 5/2004 | Wu et al. |
| 2006/0202949 A1* | 9/2006 | Danner .................. G02F 1/167 345/107 |
| 2007/0002008 A1 | 1/2007 | Tam |
| 2007/0080928 A1 | 4/2007 | Ishii et al. |
| 2007/0268565 A1* | 11/2007 | Chopra .................. G02F 1/167 359/296 |
| 2007/0273637 A1 | 11/2007 | Zhou et al. |
| 2008/0042928 A1 | 2/2008 | Schlangen et al. |
| 2008/0062159 A1* | 3/2008 | Roh ....................... G02F 1/167 345/205 |
| 2008/0117165 A1 | 5/2008 | Machida et al. |
| 2008/0174531 A1 | 7/2008 | Sah |
| 2008/0292978 A1* | 11/2008 | Lin ......................... G02F 1/167 430/32 |
| 2009/0153942 A1 | 6/2009 | Daniel et al. |
| 2009/0184897 A1 | 7/2009 | Miyamoto |
| 2009/0311484 A1 | 12/2009 | Mclellan et al. |

(56) References Cited

U.S. PATENT DOCUMENTS

| | | | |
|---|---|---|---|
| 2010/0103502 A1 | 4/2010 | Jacobson et al. | |
| 2010/0134538 A1* | 6/2010 | Sprague | G09G 3/2014 345/690 |
| 2010/0283804 A1 | 11/2010 | Sprague et al. | |
| 2011/0043543 A1 | 2/2011 | Chen et al. | |
| 2011/0175939 A1 | 7/2011 | Moriyama et al. | |
| 2011/0199671 A1 | 8/2011 | Amundson et al. | |
| 2011/0217639 A1 | 9/2011 | Sprague | |
| 2011/0234557 A1 | 9/2011 | Yang et al. | |
| 2011/0261433 A1 | 10/2011 | Sprague et al. | |
| 2012/0154899 A1* | 6/2012 | Ahn | G09G 3/344 359/296 |
| 2012/0194899 A1 | 8/2012 | Zhang | |
| 2012/0299947 A1 | 11/2012 | Tsuda et al. | |
| 2013/0114127 A1 | 5/2013 | Wang et al. | |
| 2013/0250400 A1 | 9/2013 | Sprague et al. | |
| 2013/0278995 A1 | 10/2013 | Drzaic et al. | |
| 2013/0300727 A1 | 11/2013 | Lin et al. | |
| 2014/0011913 A1 | 1/2014 | Du et al. | |
| 2014/0078036 A1 | 3/2014 | Zhang et al. | |
| 2014/0078576 A1 | 3/2014 | Sprague | |
| 2014/0268302 A1* | 9/2014 | Fujimori | G02F 1/167 359/296 |
| 2014/0313566 A1 | 10/2014 | Du et al. | |
| 2014/0340735 A1 | 11/2014 | Lin et al. | |
| 2014/0340736 A1 | 11/2014 | Lin | |
| 2014/0340737 A1 | 11/2014 | Sprague | |
| 2014/0347407 A1 | 11/2014 | Wang et al. | |
| 2015/0103394 A1 | 4/2015 | Wang et al. | |
| 2015/0198858 A1 | 7/2015 | Chan et al. | |
| 2016/0011484 A1 | 1/2016 | Chan et al. | |

FOREIGN PATENT DOCUMENTS

| | | |
|---|---|---|
| JP | 2006343458 | 12/2006 |
| JP | 2007033710 | 2/2007 |
| JP | 2007140129 | 6/2007 |
| JP | 2008-033000 | 2/2008 |
| JP | 2008129179 | 6/2008 |
| JP | 2008-209589 | 9/2008 |
| JP | 2009116041 | 5/2009 |
| JP | 2009192637 | 8/2009 |
| JP | 2011158783 | 8/2011 |
| JP | 2010128505 | 8/2013 |
| KR | 10-2007-0082680 | 8/2007 |
| KR | 10-2008-0023913 | 3/2008 |
| KR | 10-2011-0103765 | 9/2011 |
| KR | 10-2011-0112329 | 10/2011 |
| KR | 10-1232146 | 2/2013 |
| TW | 201022815 | 6/2010 |
| TW | 201022816 A | 6/2010 |
| TW | 201122697 | 7/2011 |
| TW | 201211978 A | 3/2012 |
| TW | 201237529 | 9/2012 |
| TW | 201239497 A | 10/2012 |
| WO | WO 99/53373 | 10/1999 |
| WO | WO 2003/016993 | 2/2003 |
| WO | WO2010/027810 A1 | 3/2010 |

OTHER PUBLICATIONS

Patent Cooperation Treaty, PCT/US2015/016573, PCT Notification of Transmittal of the International Search Report and the Written Opinion of the International Searching Authority, or the Declaration, Mailed on May 19, 2015.
U.S. Appl. No. 61/941,680, filed Feb. 19, 2014, Wang et al.
U.S. Appl. No. 62/061,077, filed Oct. 7, 2014, Wang et al.
U.S. Appl. No. 14/242,793, filed Apr. 1, 2014, Wang et al.
U.S. Appl. No. 14/596,160, filed Jan. 13, 2015, Chan et al.
U.S. Appl. No. 14/626,552, filed Feb. 19, 2015, Lin et al.
U.S. Appl. No. 14/629,369, filed Feb. 23, 2015, Du et al.
Seigou Kawaguchi,Taro Okada, Keisuke Tano and Koic Hi Ito__ Synthesis of polyethylene macromonomers and their radical copolymerizations with methyl methacrylate in homogeneous and oligoethylene melts media, Designed Monomers and Polymers, vol. 3, No. 3, pp. 263-277(2000).

* cited by examiner

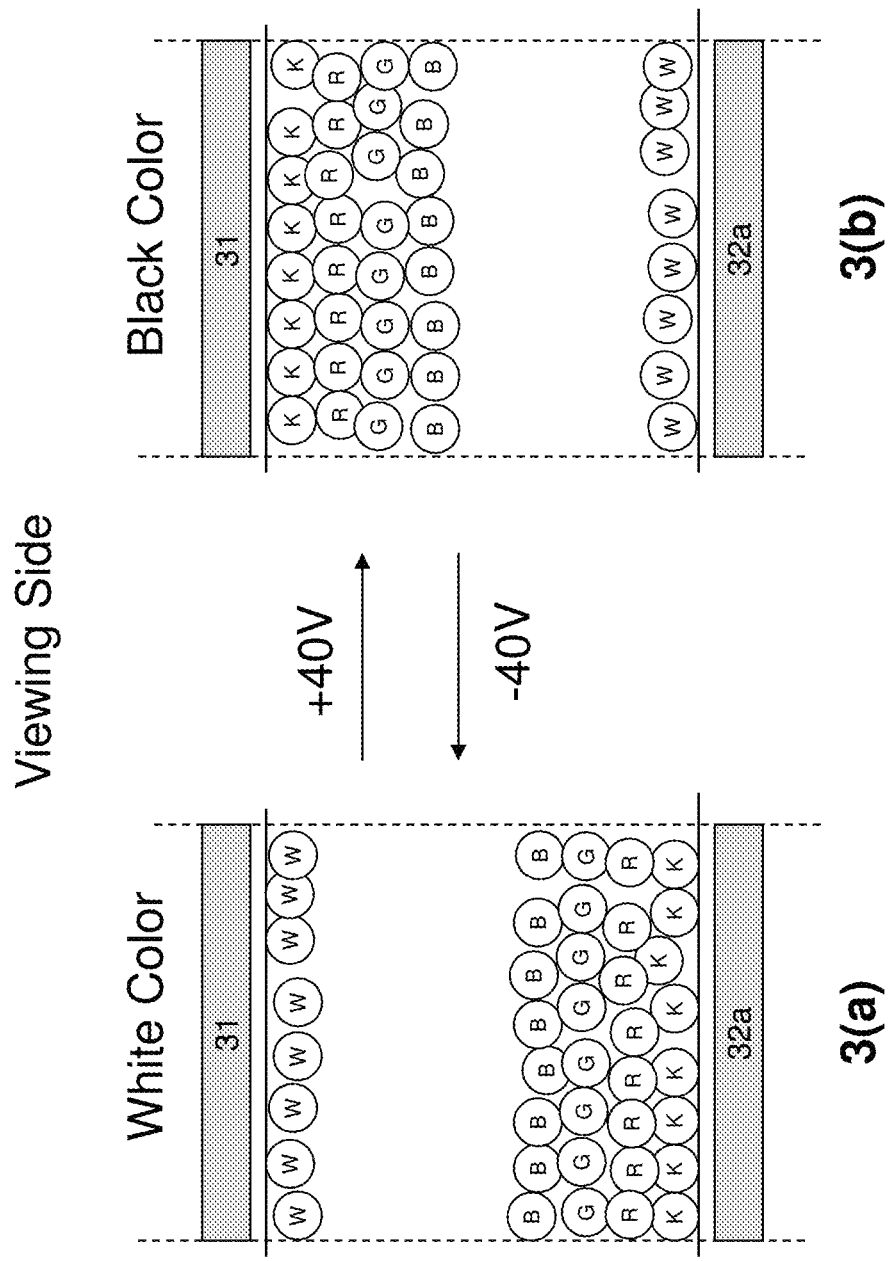

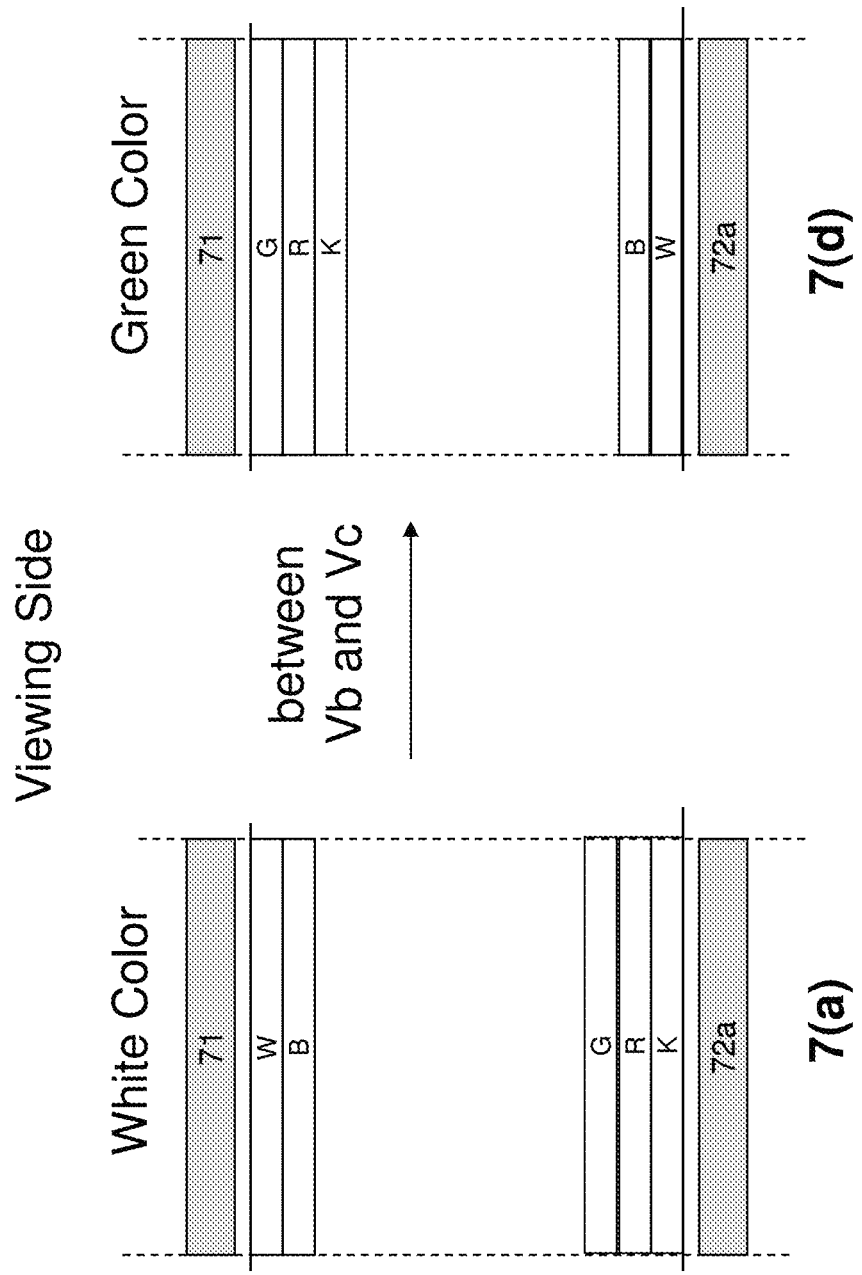

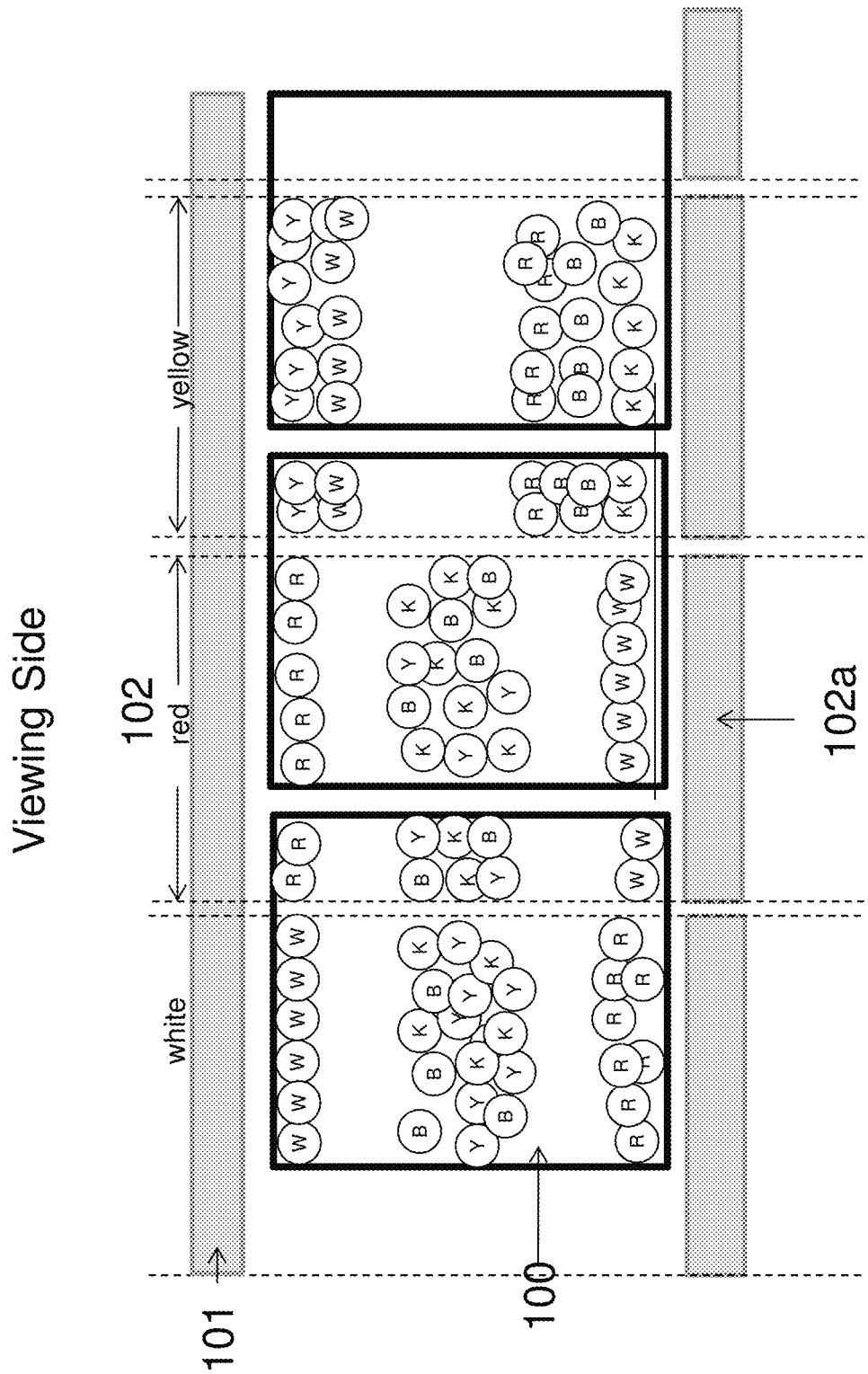

COLOR DISPLAY DEVICE

The present application claims the benefit of U.S. Provisional Application Nos. 61/941,680, filed Feb. 19, 2014, and 62/061,077, filed Oct. 7, 2014; both are incorporated herein by reference in their entireties.

FIELD OF THE INVENTION

The present invention is directed to a color display device in which each pixel can display at least five high-quality color states, and an electrophoretic fluid for such an electrophoretic display.

BACKGROUND OF THE INVENTION

In order to achieve a color display, color filters are often used. The most common approach is to add color filters on top of black/white sub-pixels of a pixelated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of using such a technique for a reflective display is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

BRIEF DISCUSSION OF THE DRAWINGS

FIGS. 2-1 to 2-5 illustrate one embodiment of the present invention.

FIGS. 3-1 to 3-4 illustrate an alternative embodiment of the present invention.

Figures 1, 2:
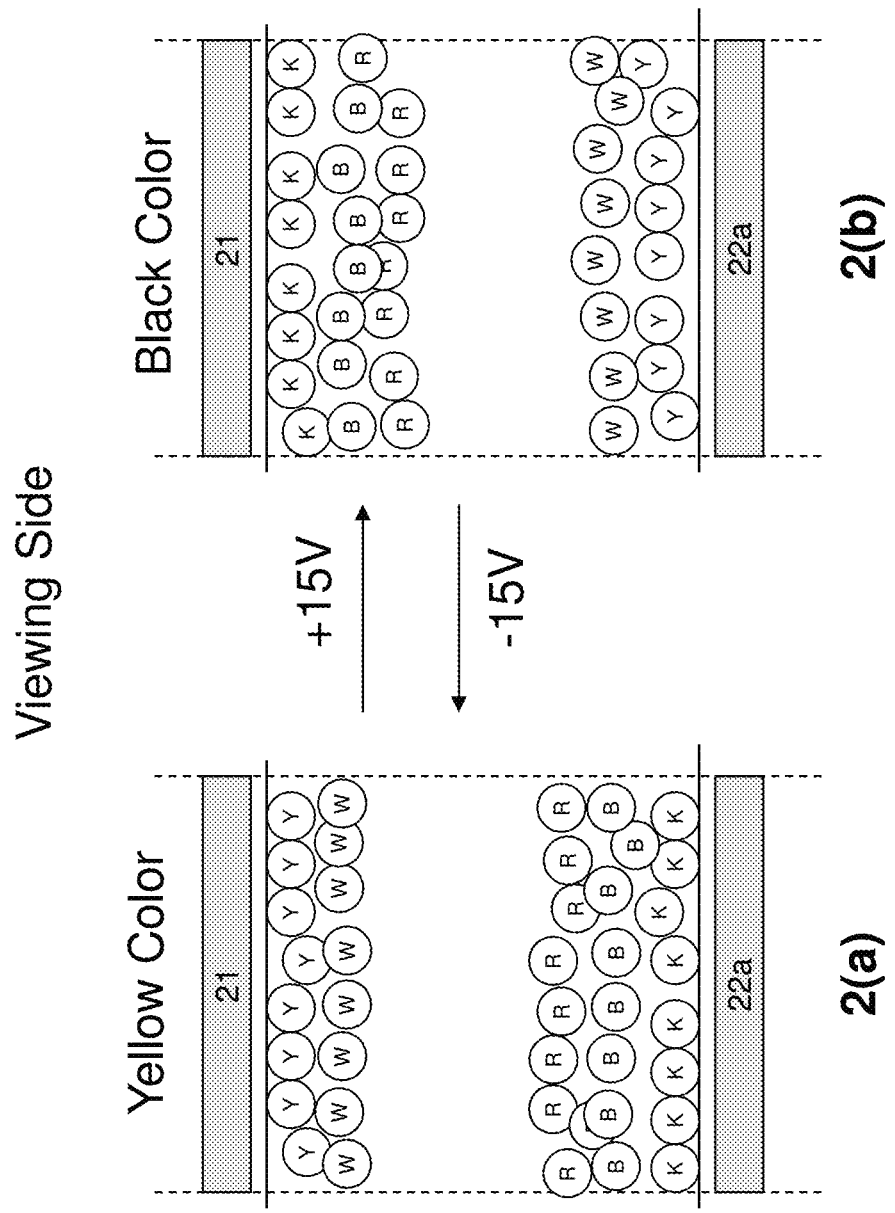
Figure 2:
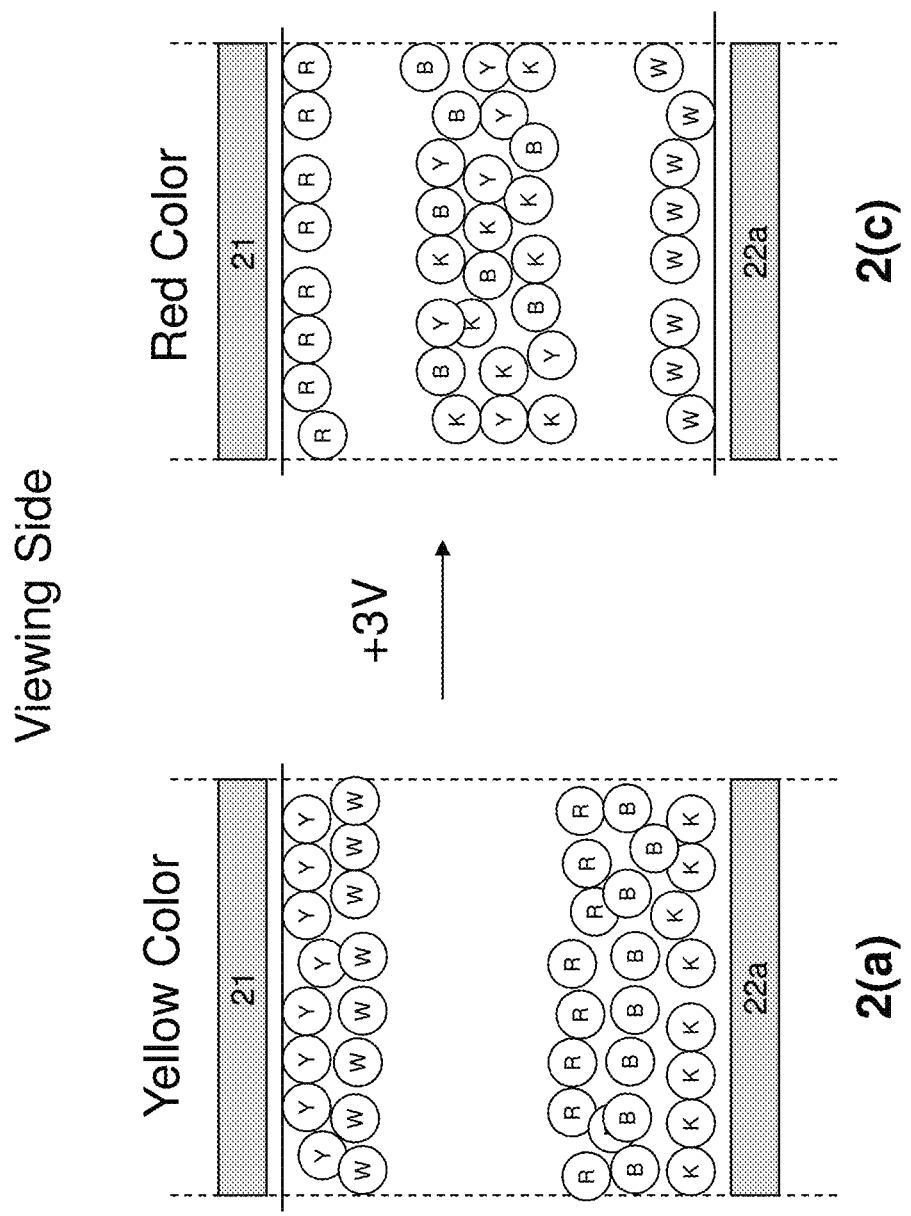
Figures 2, 3:
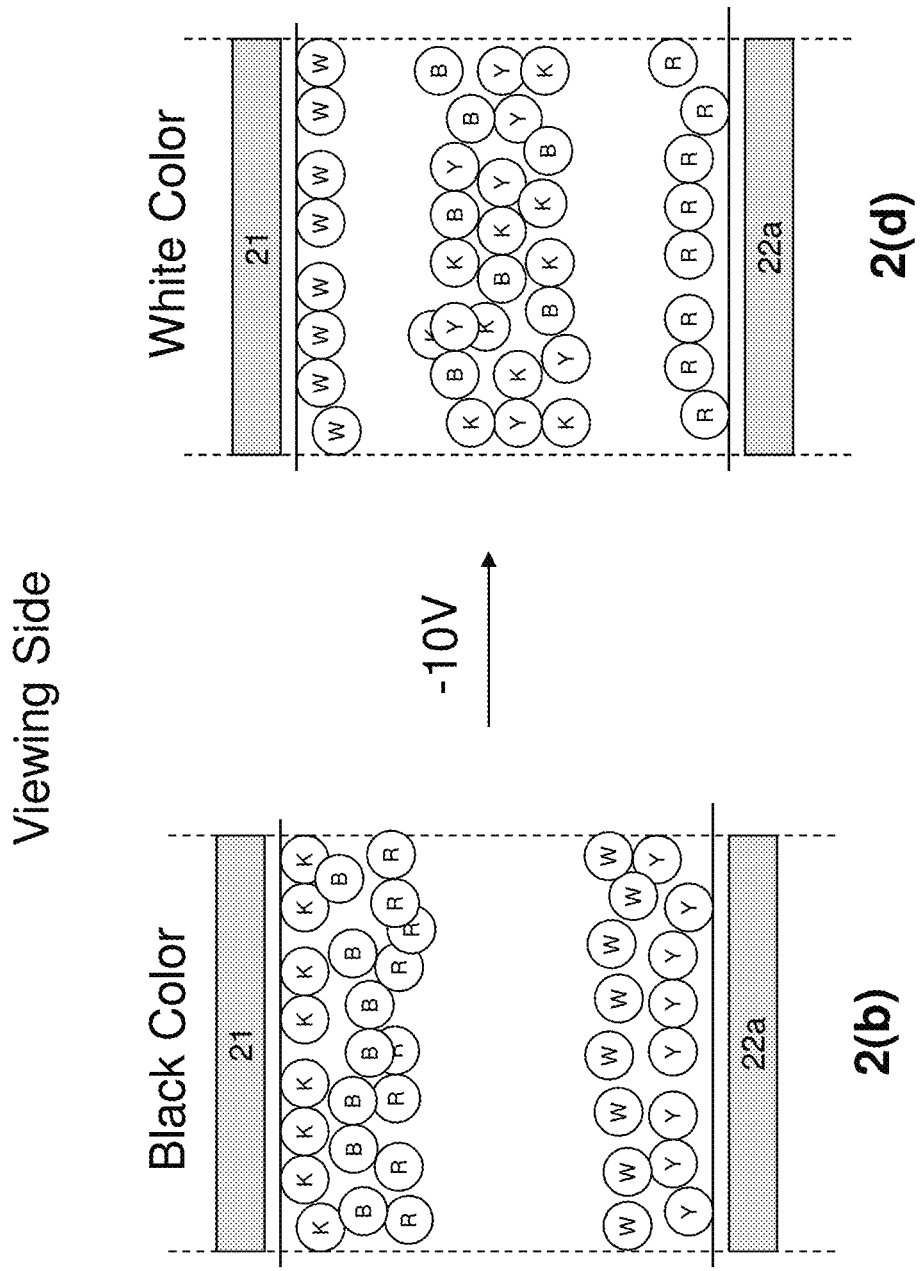
Figures 2, 3, 4:
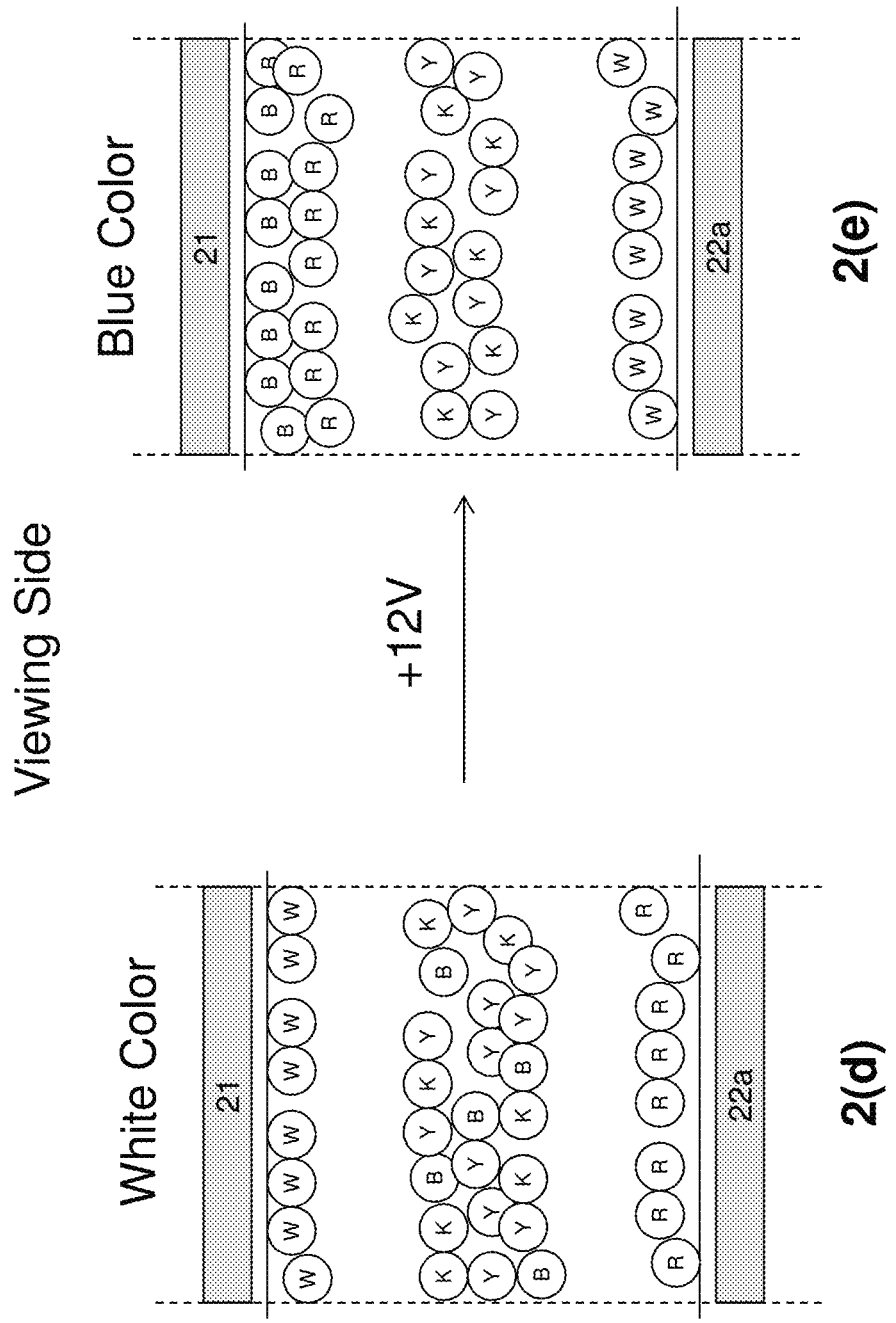

FIG. 4 demonstrates single driving pulses.

Figures 2, 3, 4, 5:
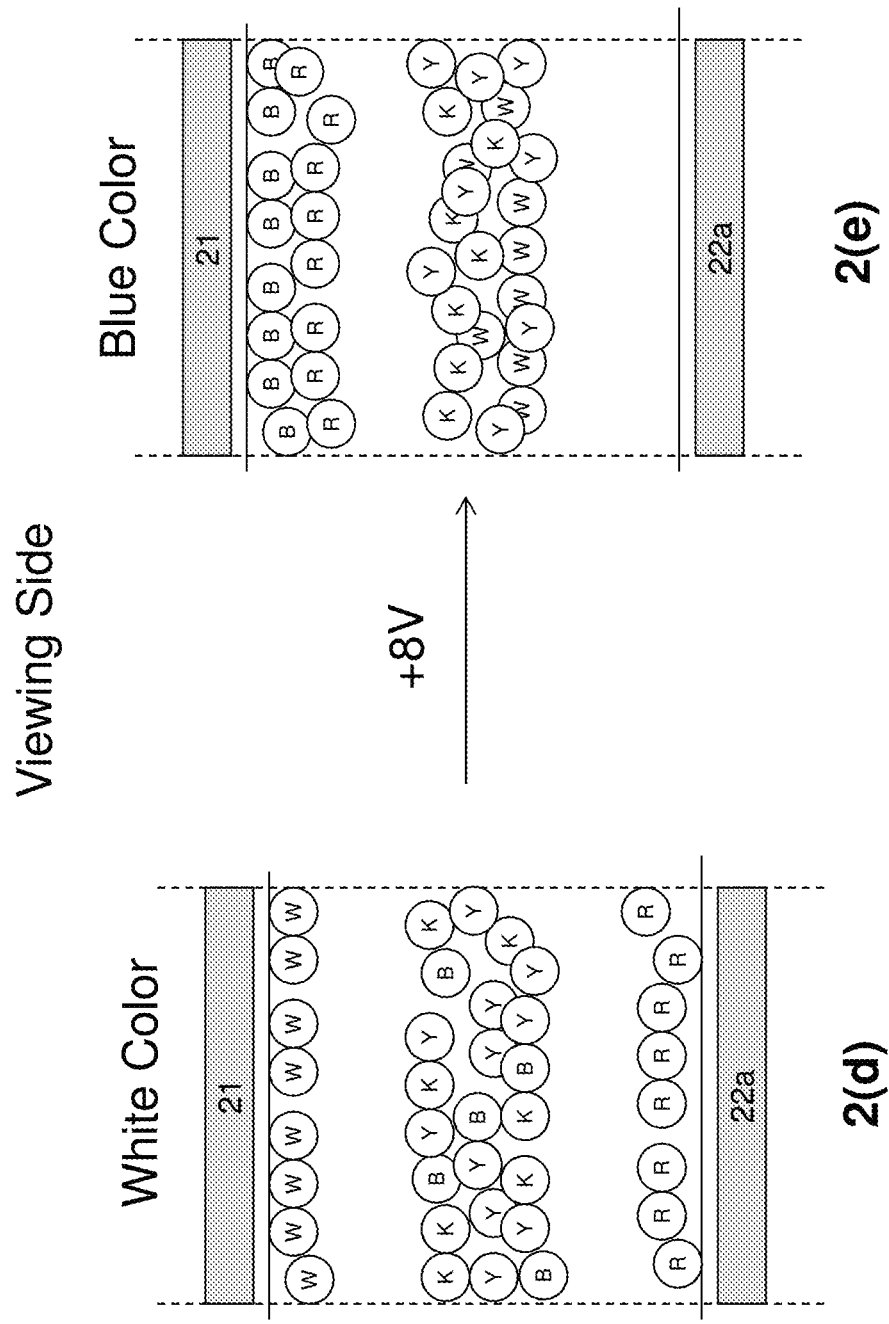
Figures 2, 3:
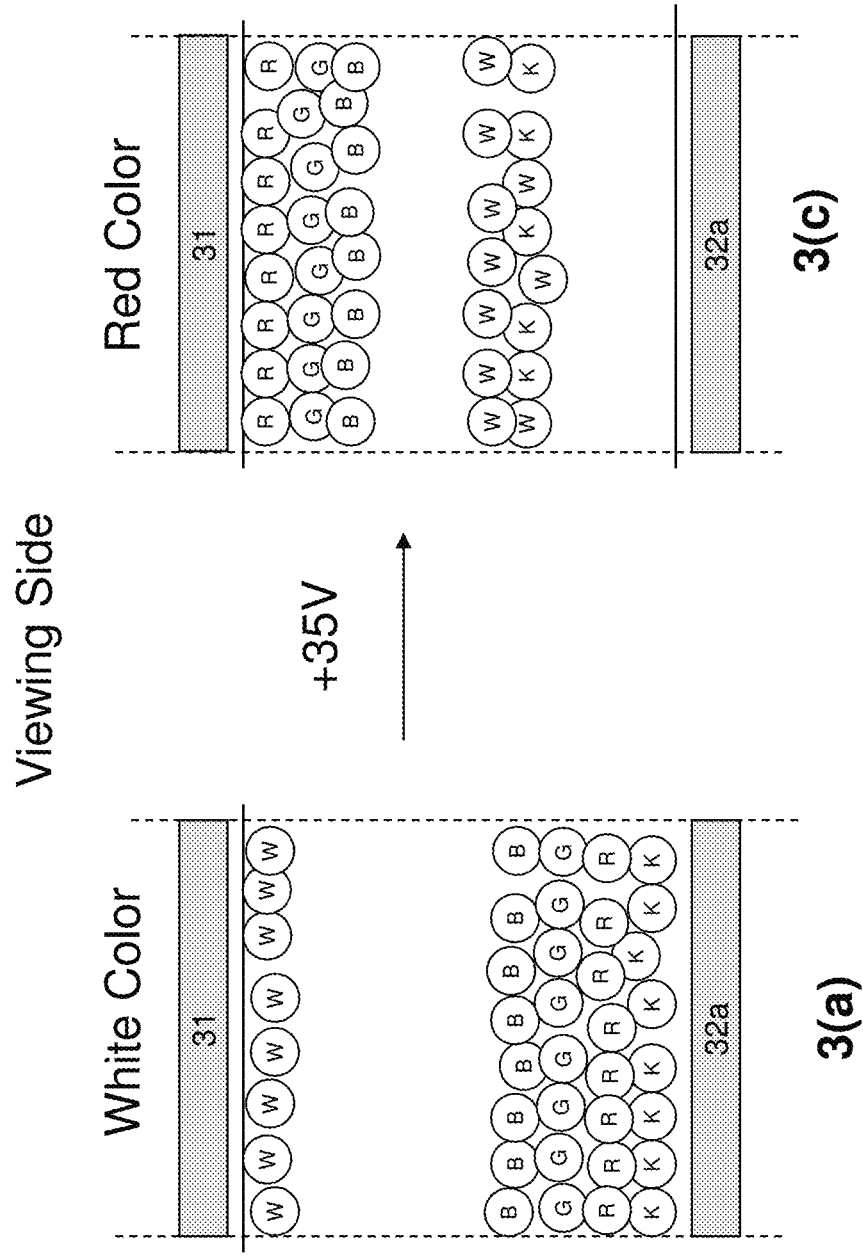
Figure 3:
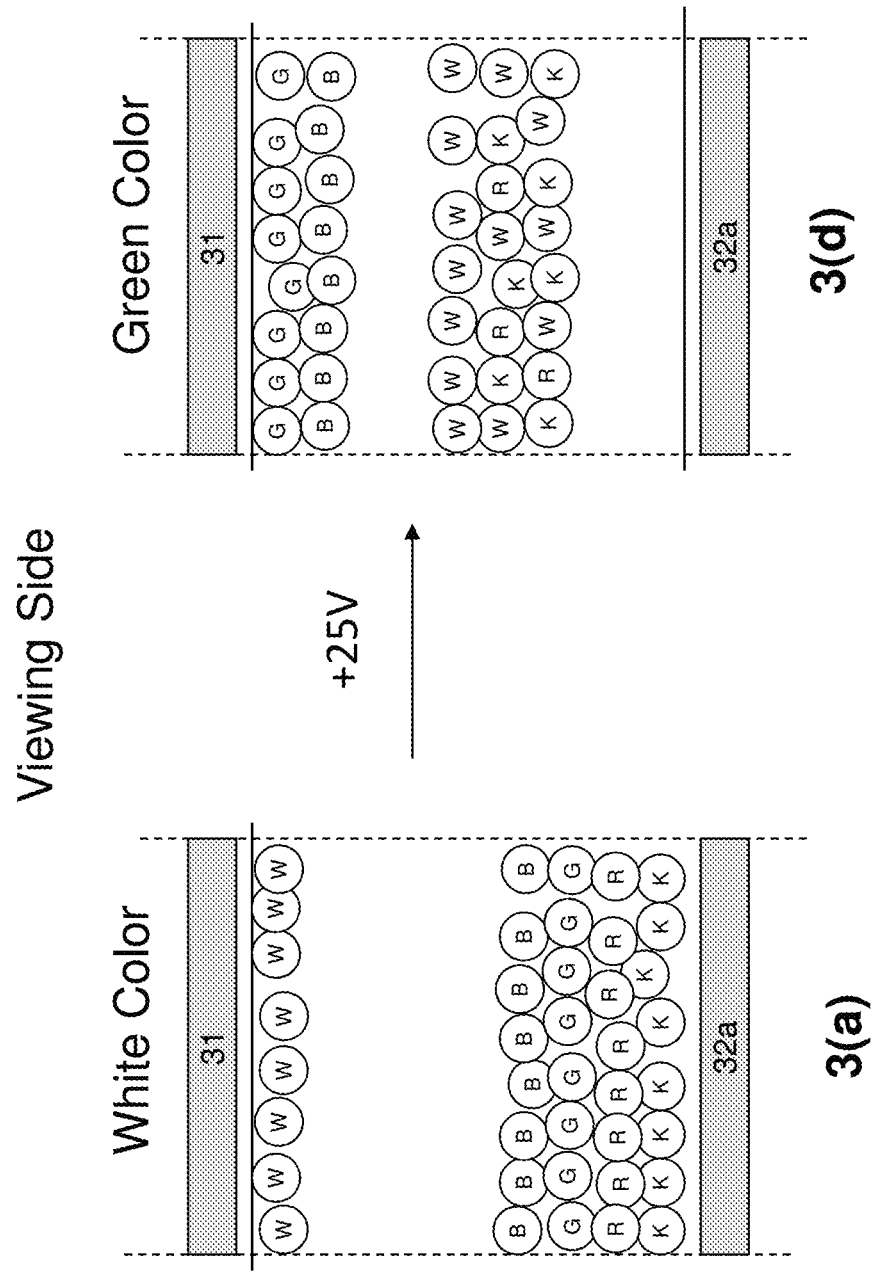
Figures 3, 4:
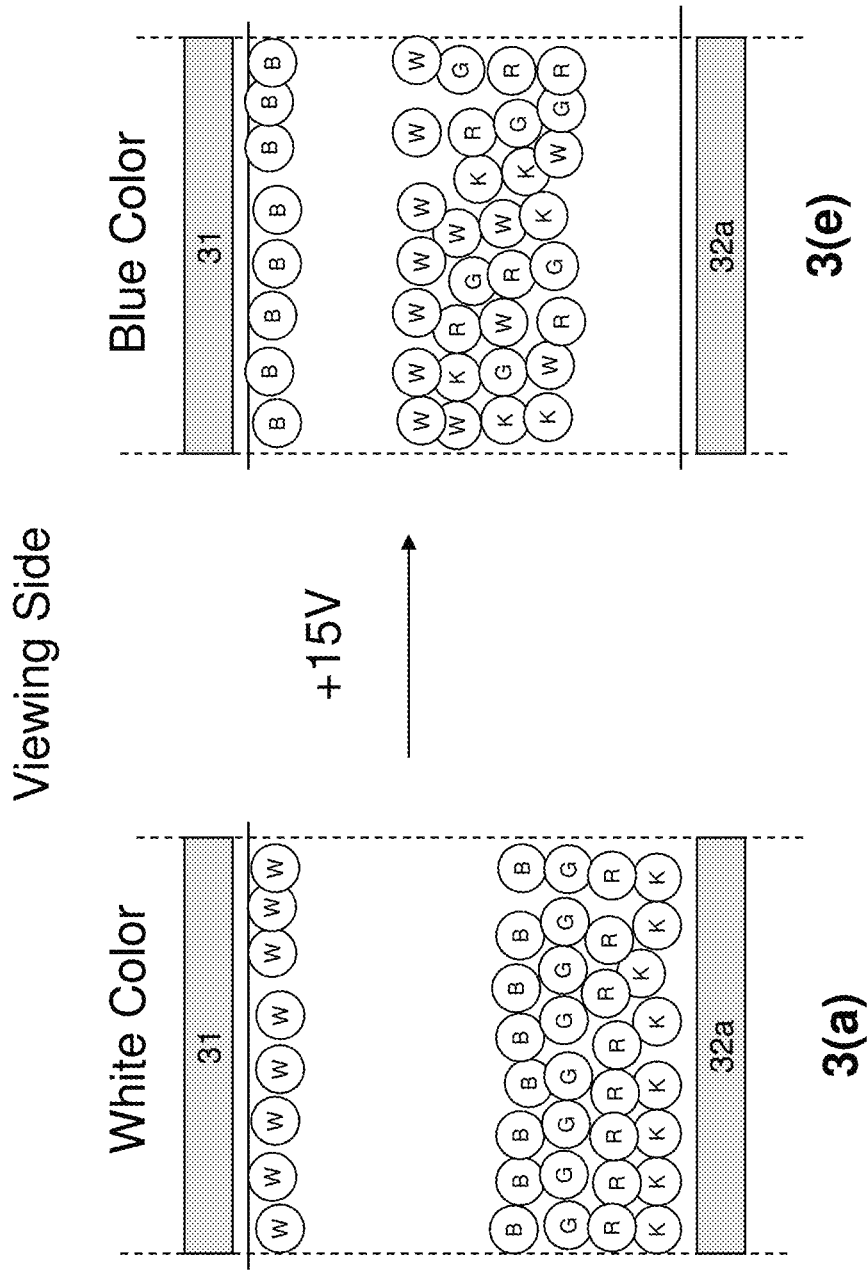
Figure 4:
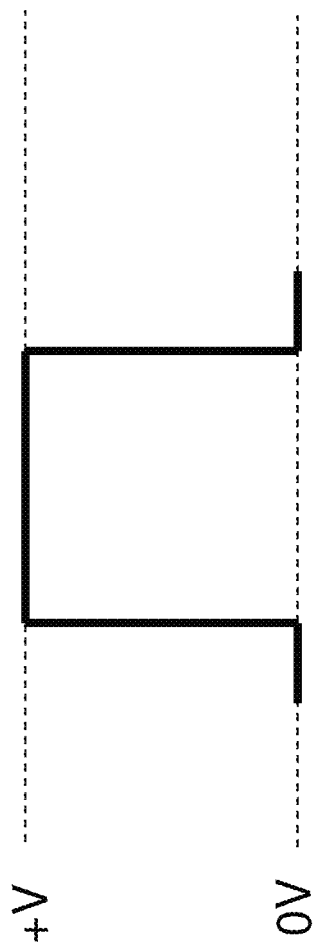
Figure 4:
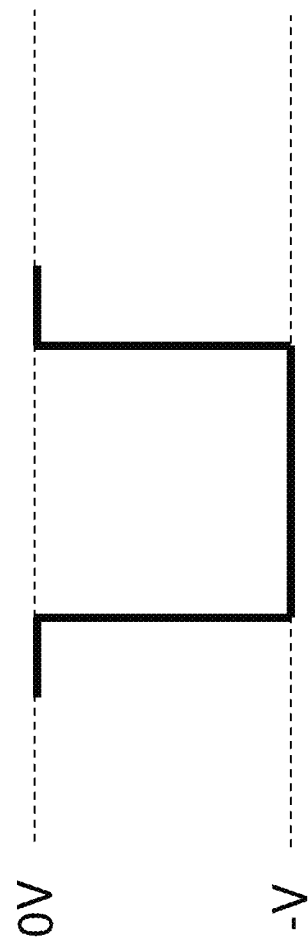
Figure 5:
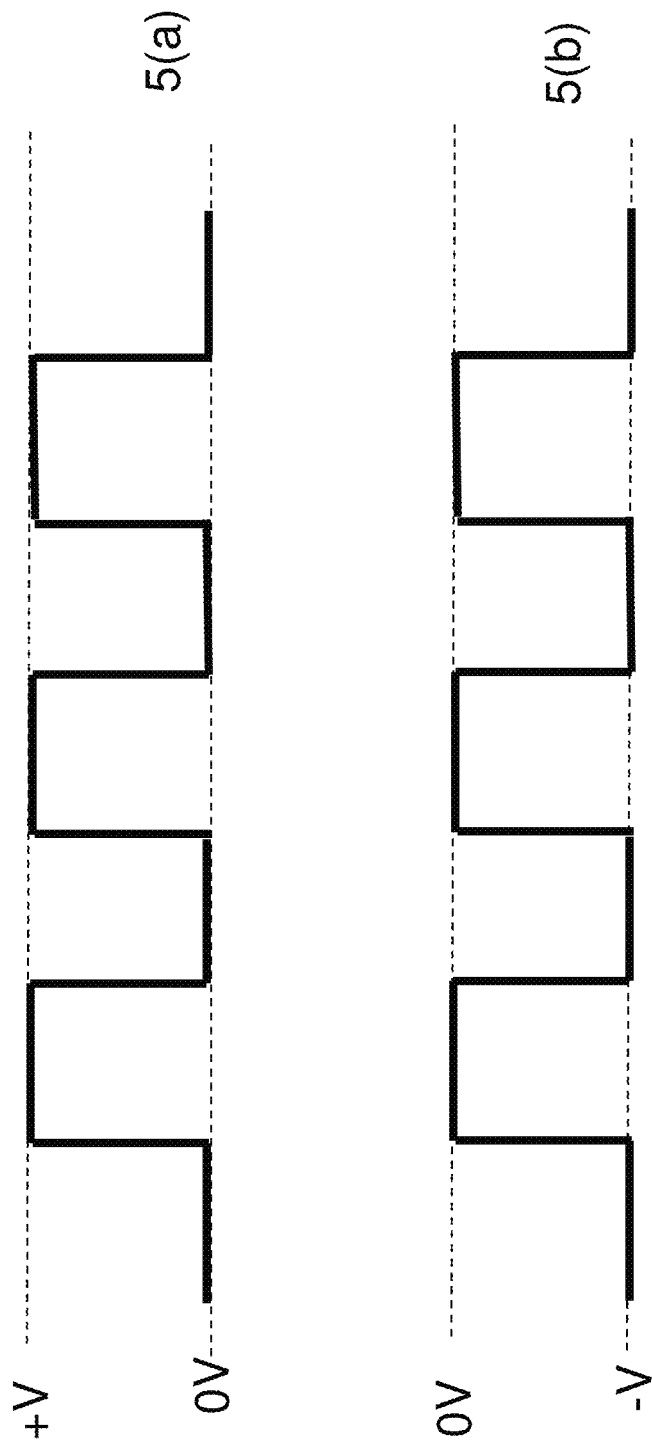

FIG. 5 demonstrates pulsing waveforms.

Figure 6:
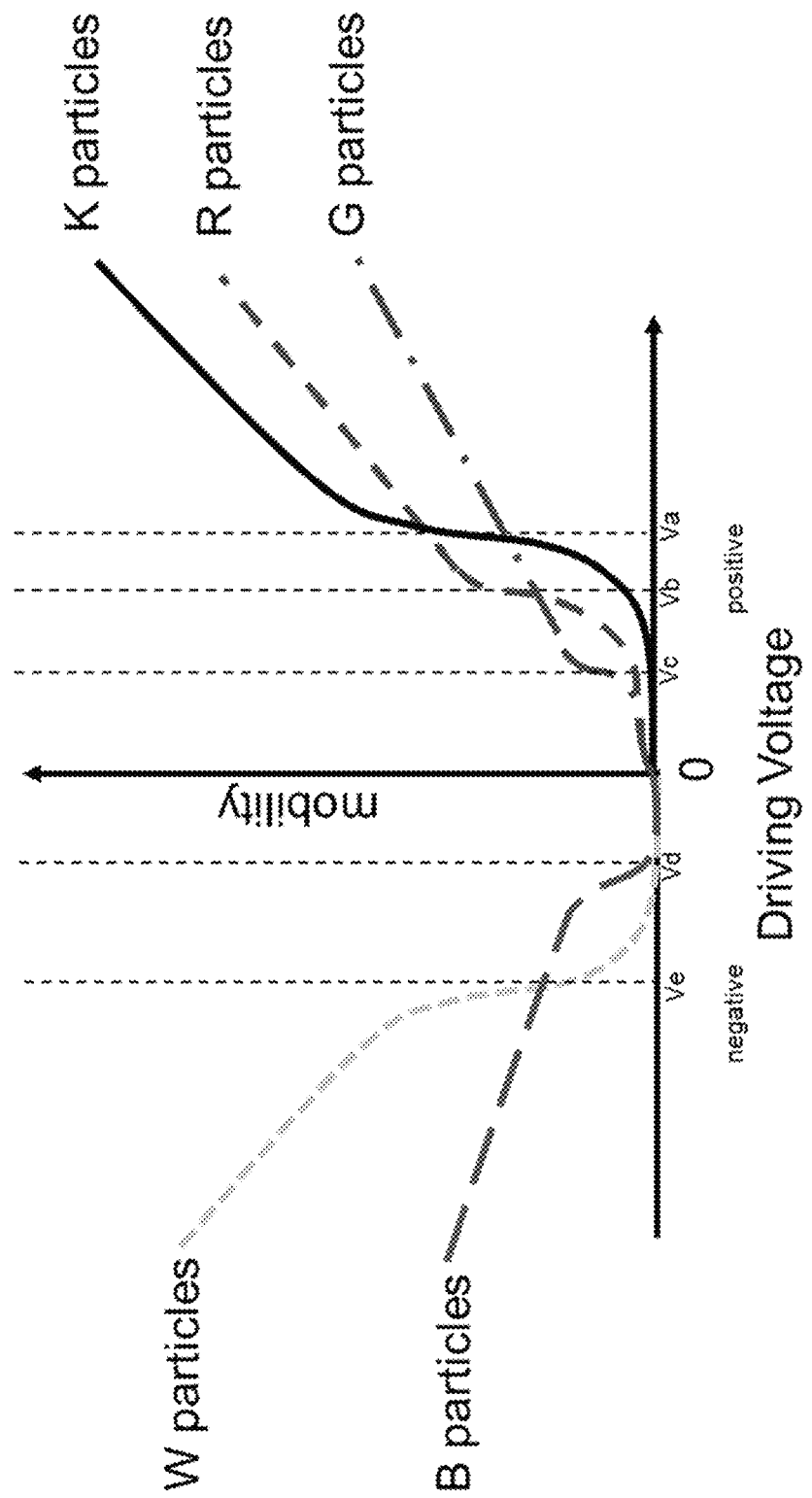

FIG. 6 shows a graph of particle mobility versus driving voltage of a system with three types of particles carrying the same charge polarity and two types of particles carrying the opposite charge polarity.

Figure 1:
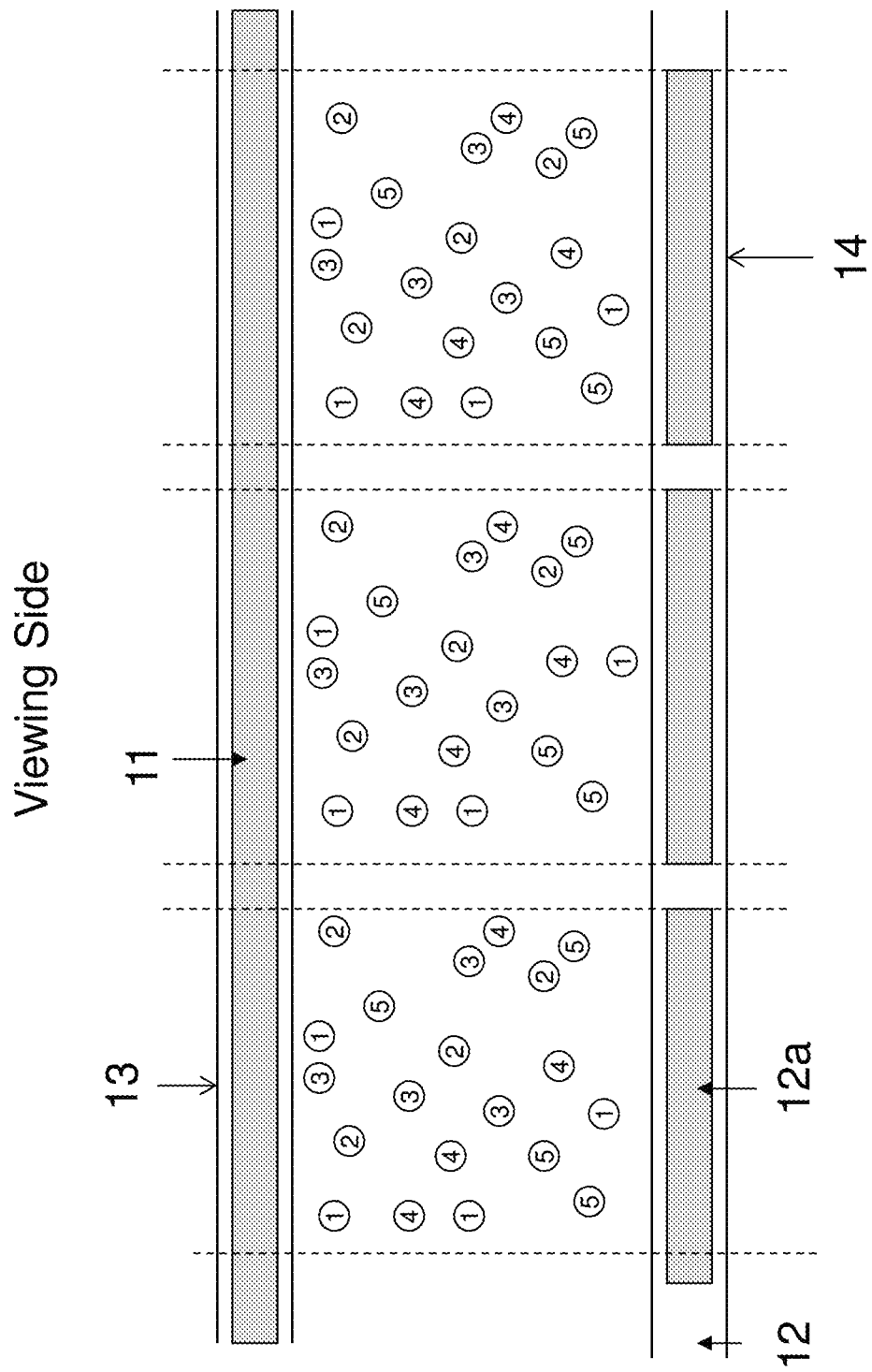
FIG. 1 depicts a display layer which can display different color states.
Figures 1, 7:
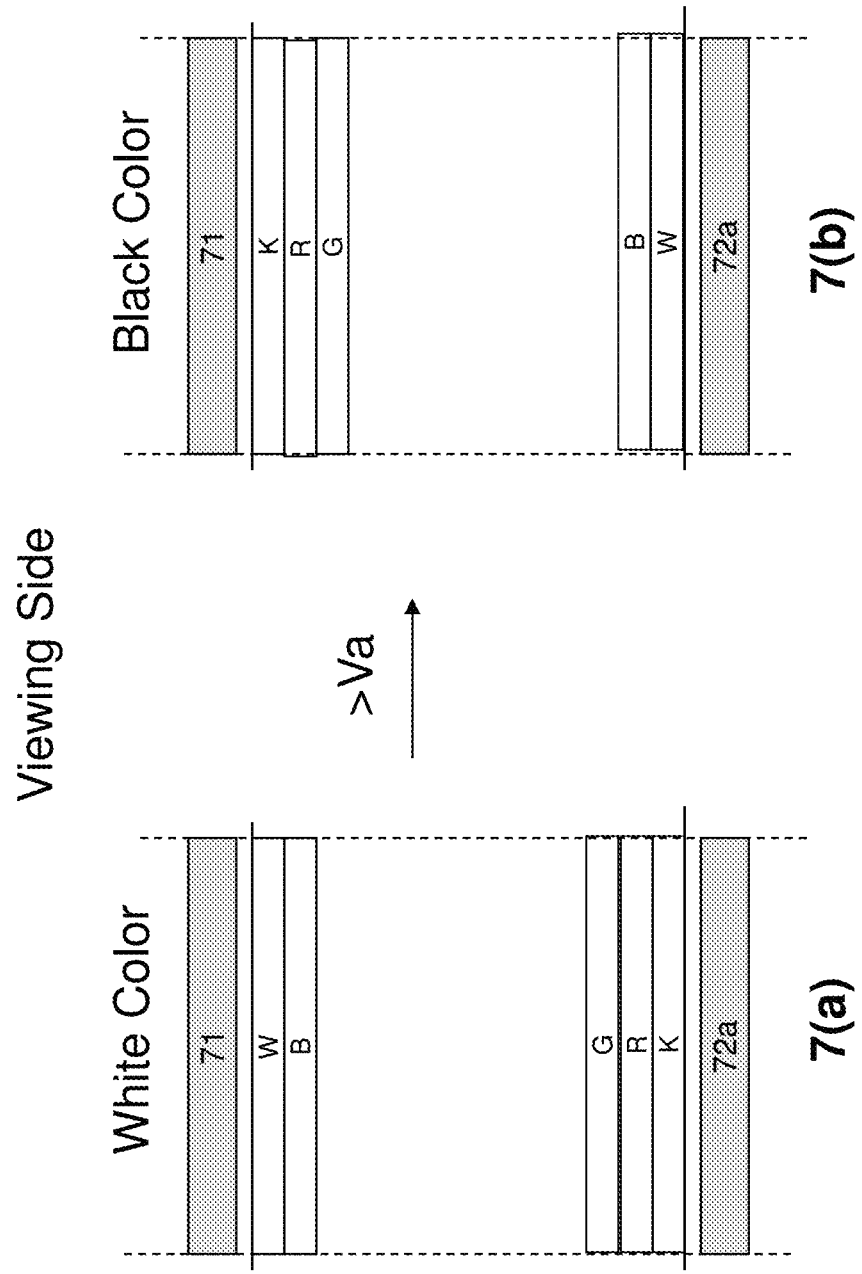
Figures 2, 7:
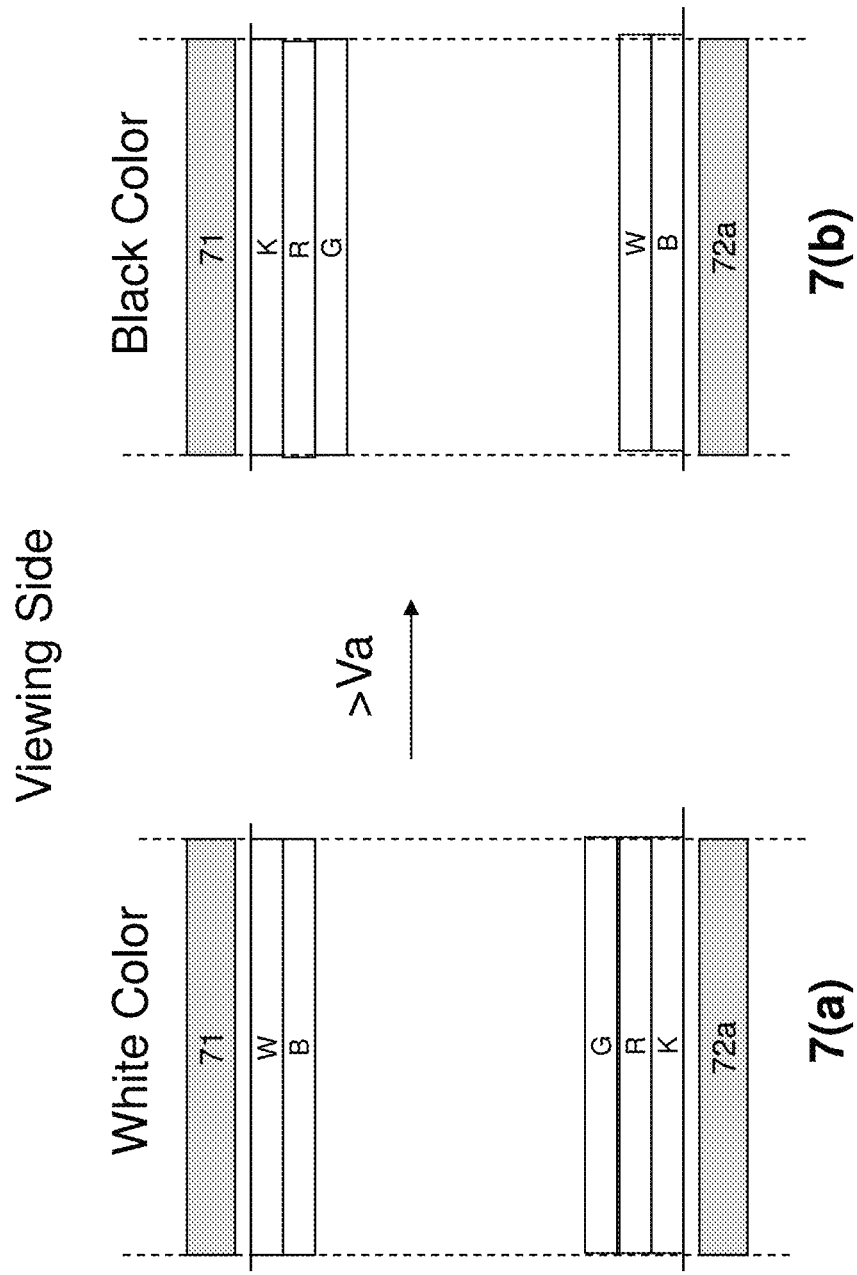
Figures 3, 7:
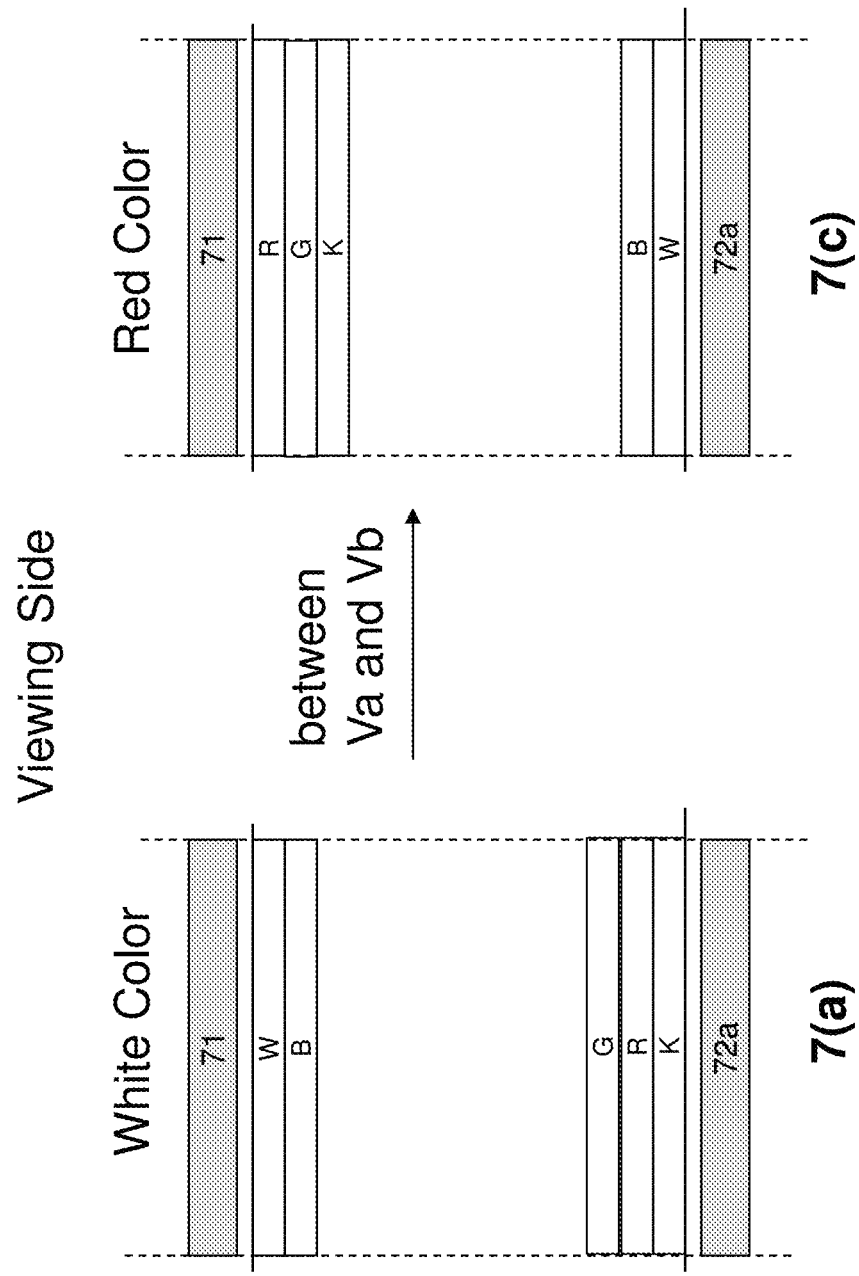
Figures 5, 7:
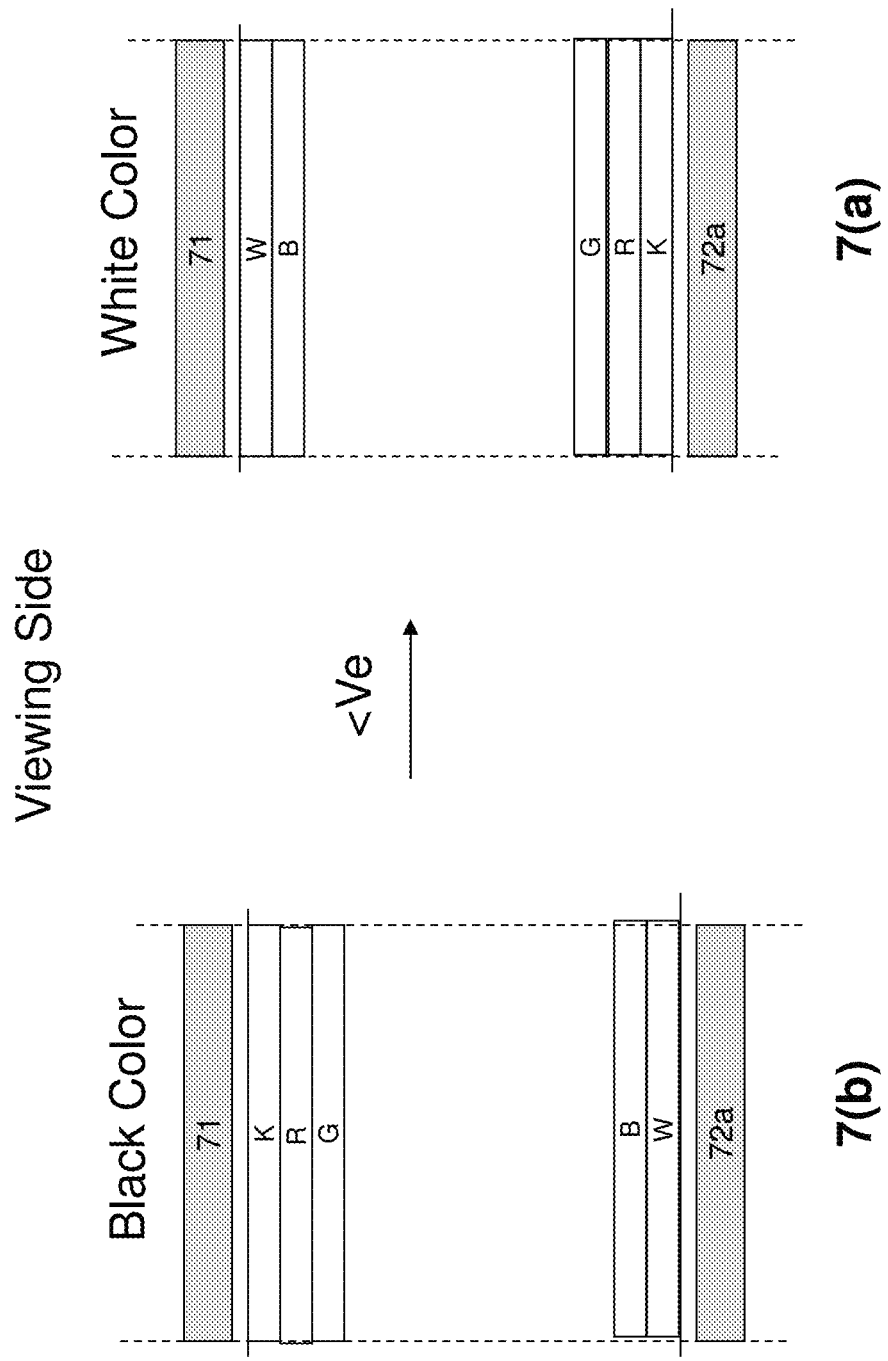
Figures 6, 7:
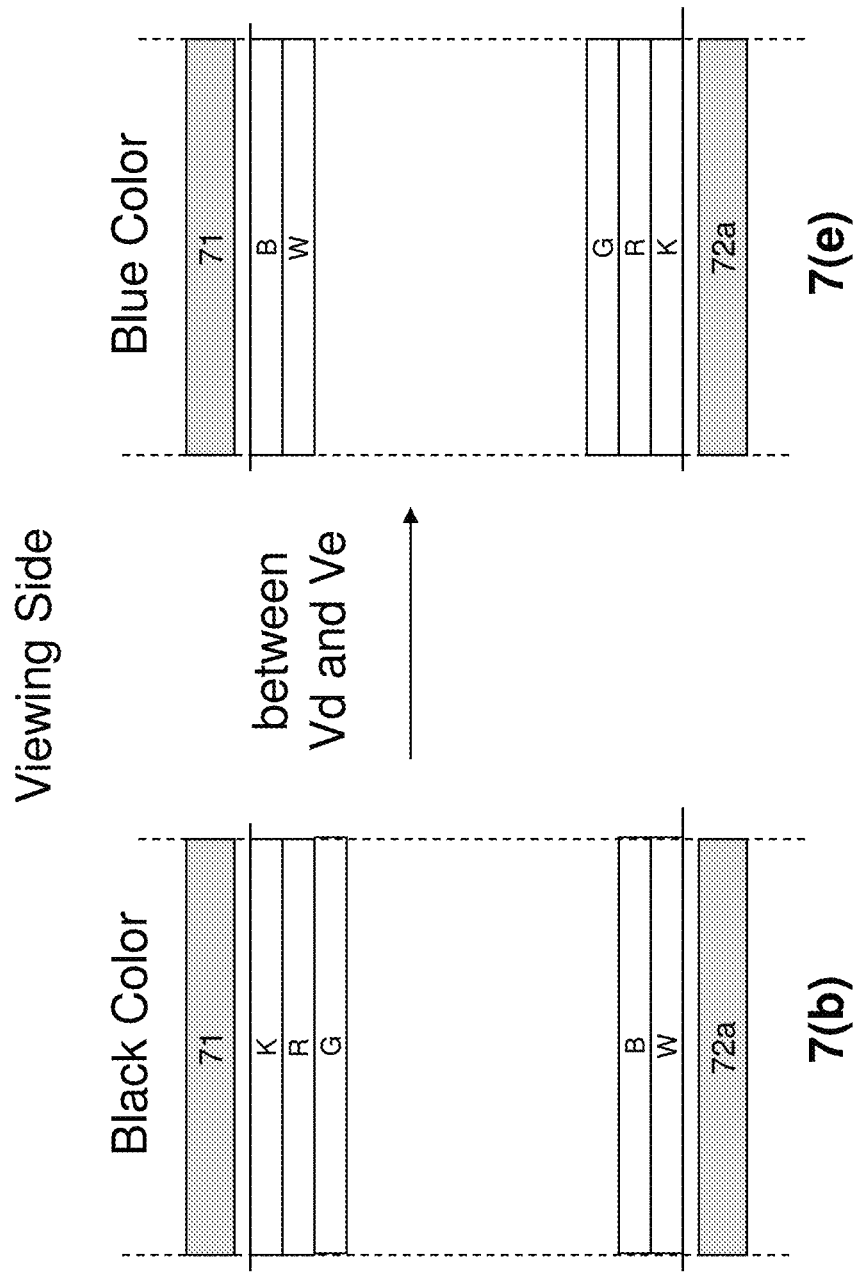

FIGS. 7-1 to 7-6 illustrate a further embodiment of the present invention.

Figure 8:
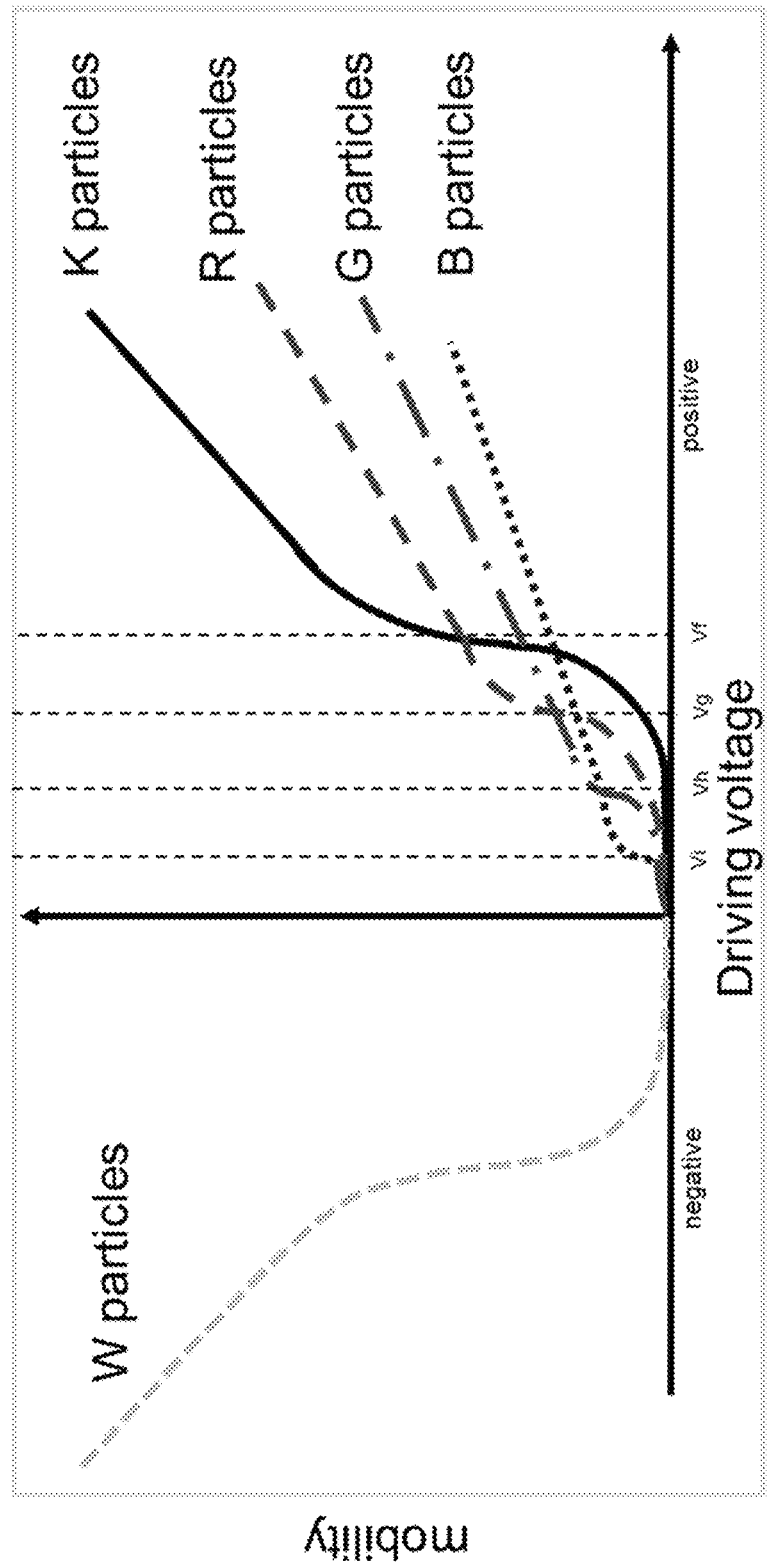

FIG. 8 shows a graph of particle mobility versus driving voltage of a system with four types of particles carrying the same charge polarity and a fifth type carrying the opposite charge polarity.

Figures 1, 9:
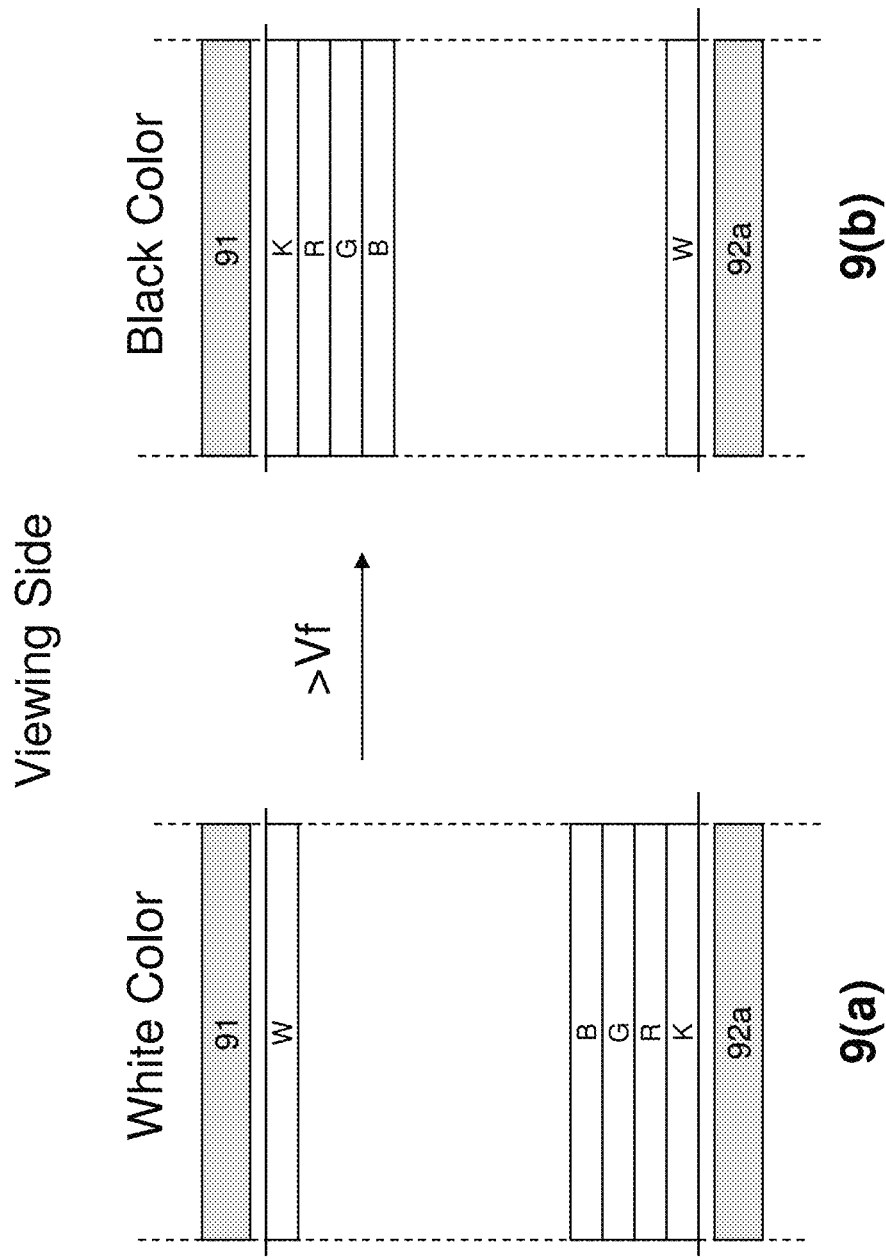
Figures 2, 9:
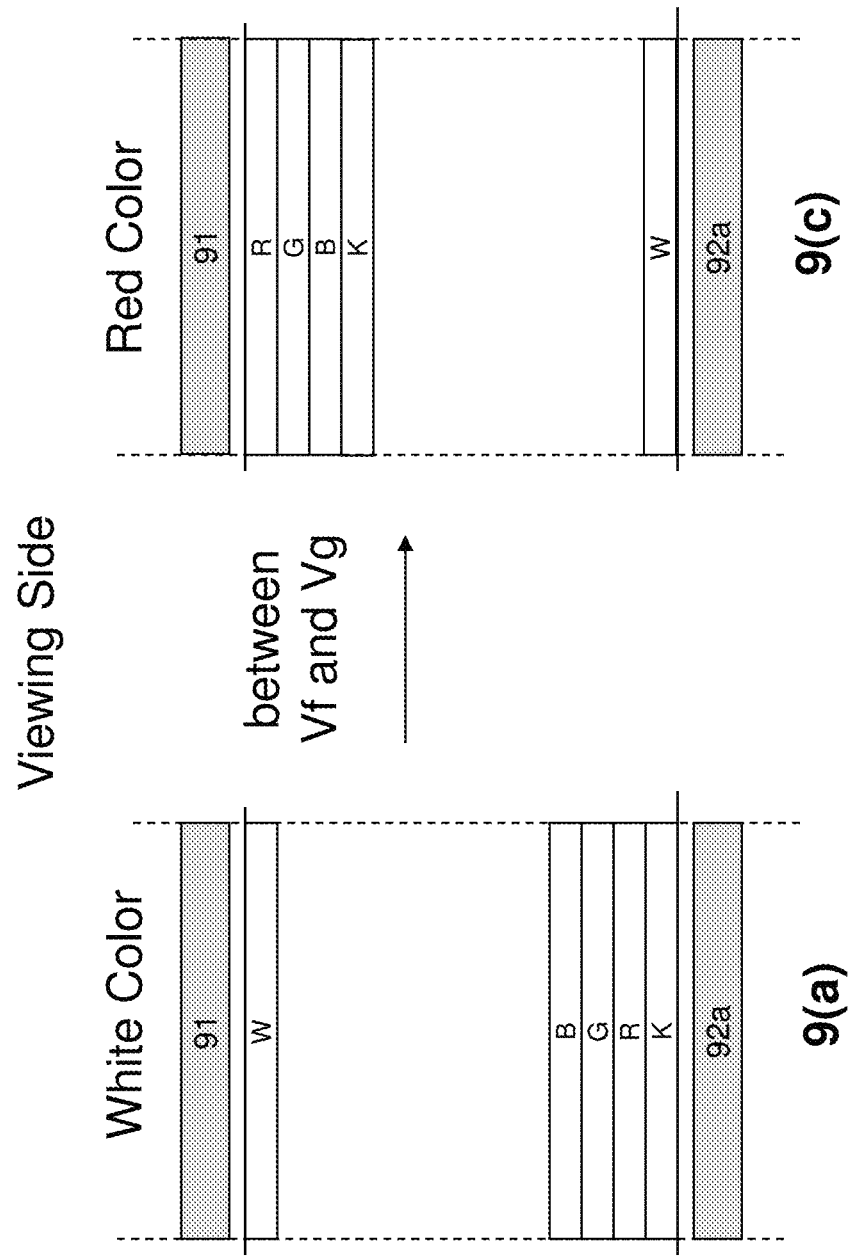
Figures 3, 9:
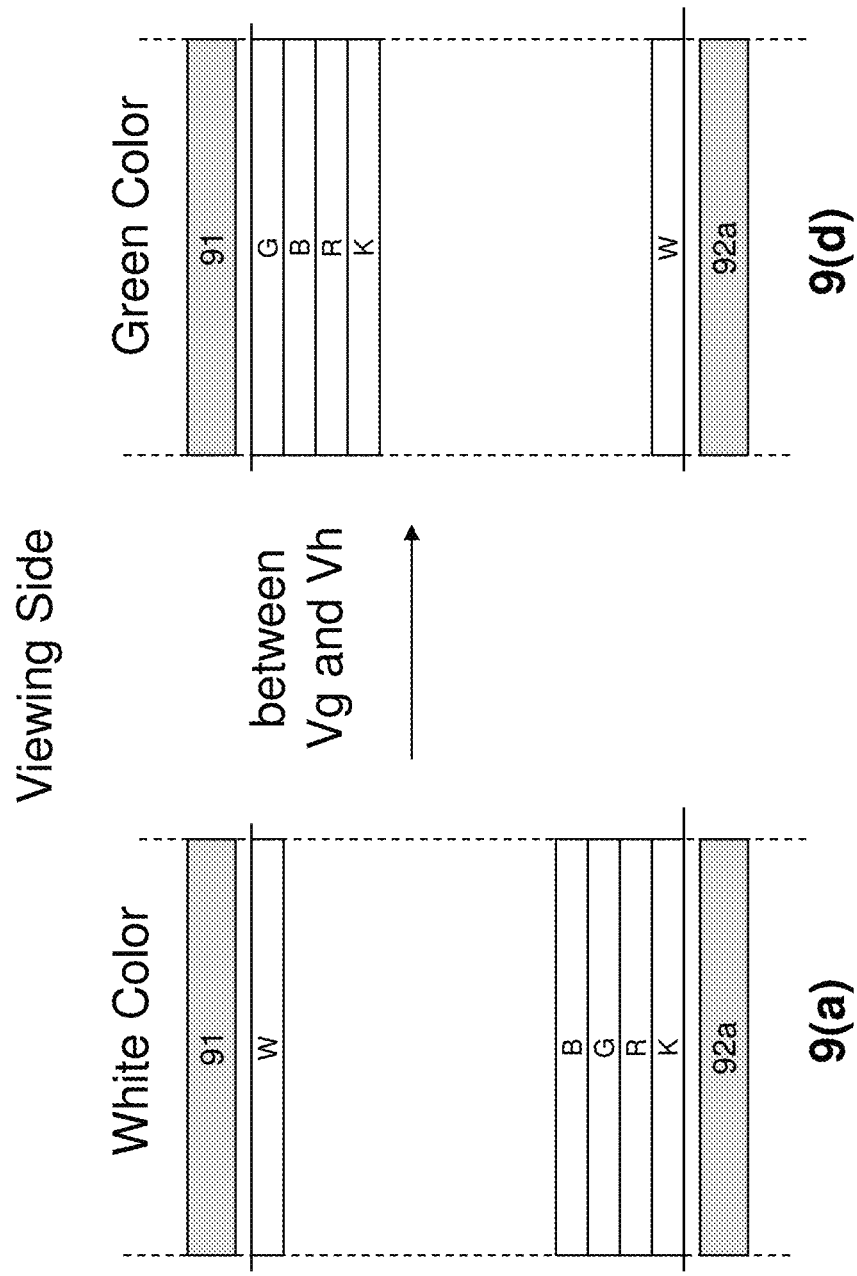
Figures 4, 9:
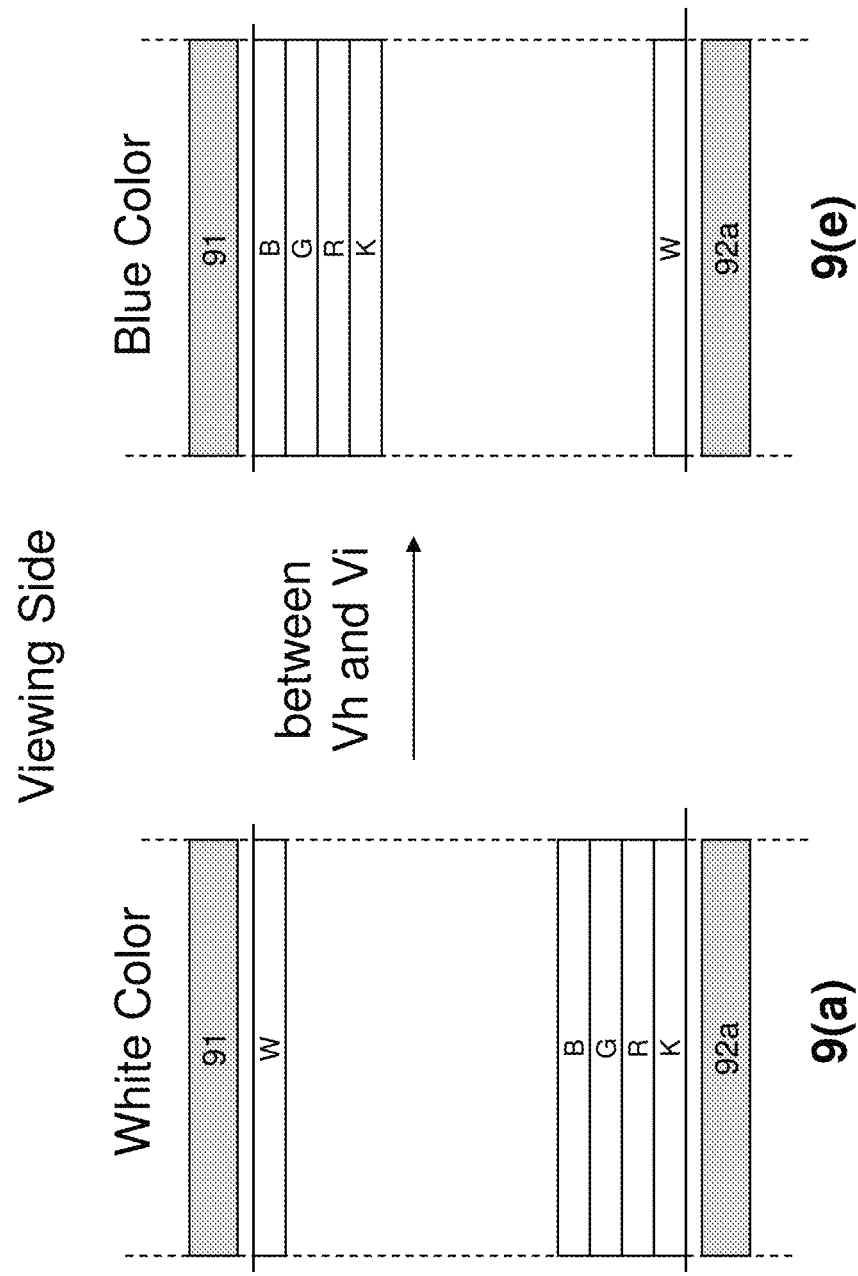
Figures 5, 9:
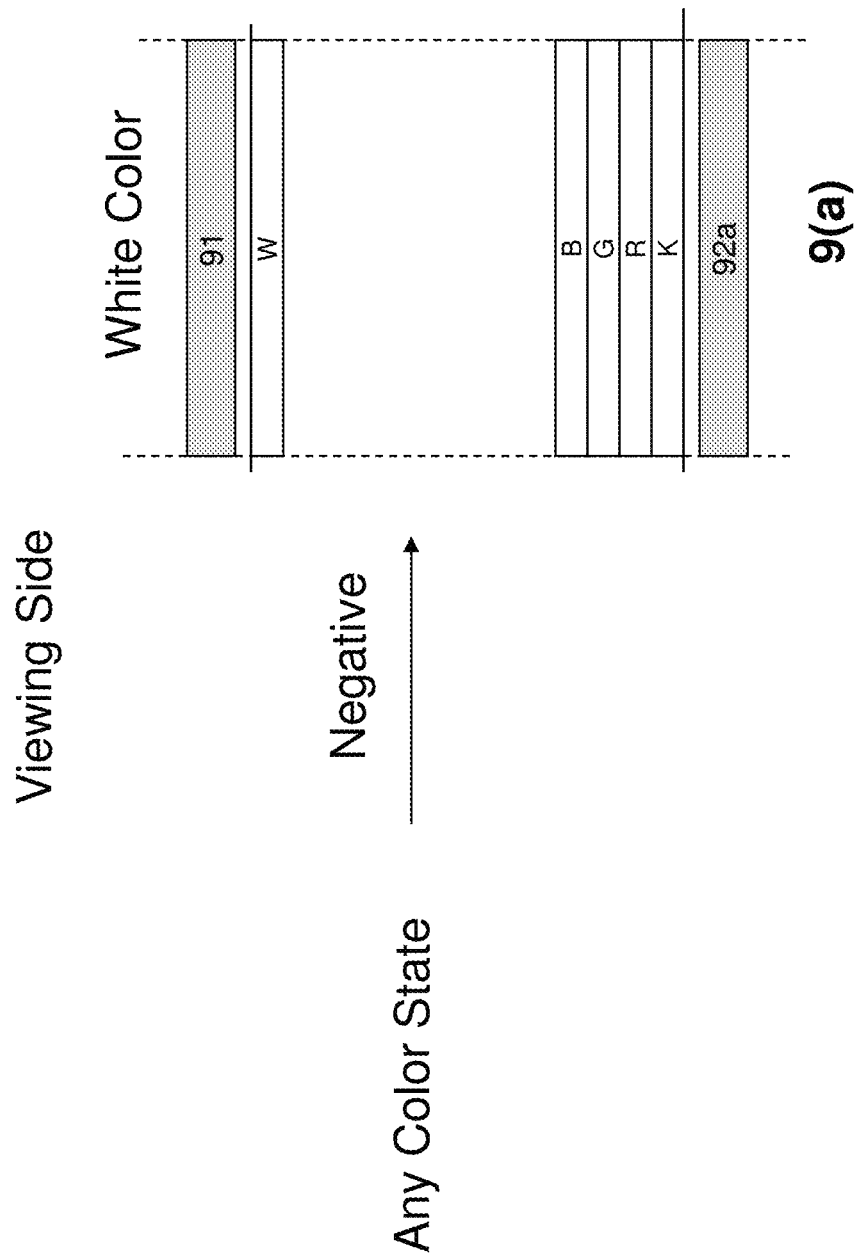

FIGS. 9-1 to 9-5 illustrate yet a further embodiment of the present invention.

FIG. 10 demonstrates display cells unaligned with pixel electrodes.

DETAILED DESCRIPTION OF THE INVENTION

The electrophoretic fluid of present invention comprises at least five types of particles dispersed in a dielectric solvent or solvent mixture.

The particles may be referred to as a first type of particles, a second type of particles, a third type of particles, a fourth type of particles and a fifth type of particles, as shown in FIG. 1. The five types of particles are of different colors.

It is understood that the scope of the invention broadly encompasses particles of any colors as long as the multiple types of particles are visually distinguishable. As an example, the five types of particles may be any combinations of white particles (W), black particles (K), red particles (R), green particles (G), blue particles (B), cyan particles (C), magenta particles (M) and yellow particles (Y).

In addition to the colors, the five different types of particles may have other distinct optical characteristics, such as optical transmission, reflectance, luminescence or, in the case of displays intended for machine reading, pseudo-color in the sense of a change in reflectance of electromagnetic wavelengths outside the visible range.

In addition, the five types of particles have different levels of charge potential. For example, the five types of particles may be high-positive particles, mid-positive particles, low-positive particles, high-negative particles and low-negative particles. Alternatively, the five types of particles may be high-negative particles, mid-negative particles, low-negative particles, high-positive particles and low-positive particles. It is also possible that among the five types of particles, four of them carry the same charge polarity and they have progressively lower magnitudes.

It is noted that the term "charge potential", in the context of the present application, may be used interchangeably with "zeta potential".

The charge polarities and levels of charge potential of the particles may be tuned, according to the method described in US Application Publication No. 2014-0011913, the content of which is incorporated herein by reference in its entirety.

The magnitudes of the "high-positive" particles and the "high-negative" particles may be the same or different. Likewise, the magnitudes of the "low-positive" particles and the "low-negative" particles may be the same or different.

The charge potentials of the particles may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

As shown, the display fluid is sandwiched between two electrode layers. One of the electrode layers is a common electrode (11) which is a transparent electrode layer (e.g., ITO), spreading over the entire top of the display device. The other electrode layer (12) is a layer of pixel electrodes (12a).

The space between two dotted vertical lines denotes a pixel. Therefore, each pixel has a corresponding pixel electrode (12a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

As also shown in FIG. 1, a display device utilizing the display fluid of the present invention has two surfaces, a first surface (13) on the viewing side and a second surface (14) on the opposite side of the first surface (13). The second surface therefore is on the non-viewing side. The term "viewing side" refers to the side at which images are viewed.

The solvent in which the particles are dispersed is clear and colorless. It preferably has a dielectric constant in the range of about 2 to about 30, more preferably about 2 to about 15 for high particle mobility. Examples of suitable dielectric solvent include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils, Greases K-Fluid Series from DuPont, Del., polydimethylsiloxane based silicone oil from Dow-corning (DC-200).

The particles are preferably opaque. They may be primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

In the case of white particles (W), the primary particles or core particles may be $TiO_2$, $ZrO_2$, ZnO, $Al_2O_3$, $Sb_2O_3$, $BaSO_4$, $PbSO_4$ or the like.

For the black particles (K), the primary particles or core particles may be Cl pigment black 26 or 28 or the like (e.g., manganese ferrite black spinel or copper chromite black spinel) or carbon black.

For the other colored particles (which are non-white and non-black), the primary particles or core particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, F2G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

For the other colored particles (which are non-white and non-black), the primary particles or core particles may also be inorganic pigments, such as red, green, blue and yellow pigments. Examples may include, but are not limited to, CI pigment blue 28, CI pigment green 50 and CI pigment yellow 227.

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

It is also noted that the five types of particles may have different particle sizes. For example, the smaller particles may have a size which ranges from about 50 nm to about 800 nm. The larger particles may have a size which is about 2 to about 50 times, and more preferably about 2 to about 10 times, the sizes of the smaller particles.

The first aspect of the present invention is directed to a display device utilizing an electrophoretic fluid comprising five types of particles and the colors are displayed because of different levels of attraction forces among the particles.

In the first embodiment of this aspect of the invention, among the five types of particles, three types carry a charge polarity opposite from the charge polarity of the other two types. The following is an example illustrating this embodiment of the present invention.

Example 1

In this example as shown in FIG. 2, the black particles (K) (i.e., the first type) carry a positive charge and the yellow particles (Y) (i.e., the second type) carry a negative charge. The blue (B) (i.e., the third type) and red (R) (i.e., the fourth type) particles are positively charged; but their magnitudes are progressively less than that of the black particles, which means that the black particles are high-positive particles, the blue particles are mid-positive particles and the red particles are low-positive particles. The white (W) particles (i.e., the fifth type) are negatively charged; but their magnitude is less than that of the yellow particles, which means that the yellow particles are high-negative particles and the white particles are low-negative particles.

FIG. 2-1

In FIG. 2-1, when a high negative driving voltage (e.g., −15V) is applied to the pixel (2b) for a time period of sufficient length, an electric field is generated to cause the high negatively charged yellow particles to be pushed to the common electrode (21) side and the high positively charged black particles pulled to the pixel electrode (22a) side.

The low positively charged red and mid positively charged blue particles move slower than the high positively charged black particles and as a result, the blue particles are above the black particles but below the red particles because the blue particles carry higher charge potential than the red particles. The black particles are closest to the pixel electrode side.

The low negatively charged white particles move slower than the high negatively charged yellow particles, and therefore the white particles are below the yellow particles and therefore not seen at the viewing side. In this case, a yellow color is seen at the viewing side (see 2(a)).

In FIG. 2-1, when a high positive driving voltage (e.g., +15V) is applied to the pixel 2(a) for a time period of sufficient length, an electric field of an opposite polarity is generated which causes the particle distribution to be opposite of that shown in FIG. 2(a) and as a result, a black color is seen at the viewing side.

It is also noted that the high driving voltage applied in FIG. 2-1 may be a single pulse as shown in FIG. 4a or 4b or a pulsing waveform as shown in FIG. 5a or 5b.

The pulsing waveform has alternating 0V and a driving voltage. The magnitude of the driving voltage referred to may be or may not be the same as that of the driving voltage for the single pulse method. There may be 10-200 cycles of pulsing. The pulsing waveform may lead to better color performance because it can prevent aggregation of the particles with each other, which usually causes reduction of hiding power of the layers of the particles.

FIG. 2-2

In FIG. 2-2, when a low positive driving voltage (e.g., +3V) is applied to the pixel of FIG. 2(a) (that is, driven from the yellow state) for a time period of sufficient length, an electric field is generated to cause the high negatively charged yellow particles to move towards the pixel electrode (22a) while the high positively charged black and mid positively charged blue particles move towards the common electrode (21). However, when they meet in the middle of the pixel, they significantly slow down and remain there because the electric field generated by the low driving voltage is not strong enough to overcome the attraction forces between them. As shown, the yellow, black and blue particles stay in the middle of the pixel in a mixed state.

The term "attraction force" in the context of the present application, encompasses electrostatic interactions, linearly dependent on the particle charge potentials, and the attraction force can be further enhanced by introducing other forces, such as Van der Waals forces, hydrophobic interactions or the like.

On the other hand, there are also attraction forces between low positively charged red particles with high positively charged yellow particles and the low negatively charged white particles with high positively charged black and mid positively charged blue particles. However, these attraction forces are not as strong as the attraction forces between the black particles and yellow particles and between the blue particles and yellow particles, and therefore they can be overcome by the electric field generated by the low driving voltage. In other words, the low charged particles and the high charged particles of opposite polarity can be separated.

In addition, the electric field generated by the low driving voltage is sufficient to separate the low negatively charged white and low positively charged red particles to cause the red particles to move to the common electrode (21) side (i.e., the viewing side) and the white particles to move to the pixel electrode (22a) side. As a result, a red color is seen. In this case, the white particles are closest to the pixel electrode.

The low positive driving voltage in FIG. 2-2 may be applied as a single pulse as shown in FIG. 4a or 4b or a pulsing waveform as shown in FIG. 5a or 5b. The magnitude of the driving voltage in the pulsing waveform may be the same as, or different from, that of the single driving pulse. In the pulsing waveform, there may be 10-200 cycles of pulsing.

The driving method of FIG. 2-2 can therefore be summarized as follows:

A driving method for driving an electrophoretic display comprising a first surface on a viewing side, a second surface on a non-viewing side, and an electrophoretic fluid which fluid is sandwiched between a common electrode at the viewing side and a layer of pixel electrodes and comprises a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprises applying a driving voltage or a pulse waveform of alternating a driving voltage and no driving voltage, to a pixel in the electrophoretic display, wherein the pixel is in the color state of the second type of particles, and the driving voltage has the same polarity as the first, third and fourth types of particles to drive the pixel towards the color state of the fourth type of particles at the viewing side.

In this driving method, the driving voltage referred to is a low positive driving voltage.

FIG. 2-3:

In FIG. 2-3, when a low negative driving voltage (e.g., −10V) is applied to the pixel of FIG. 2(b) (that is, driven from the black state) for a time period of sufficient length, an electric field is generated which causes the high positively charged black and mid positively charged blue particles to move towards the pixel electrode (22a) while the high negatively charged yellow particles move towards the common electrode (21). However, when they meet in the middle of the pixel, they significantly slow down and remain there because the electric field generated by the low driving voltage is not strong enough to overcome the attraction between them. As shown, the yellow, black and blue particles stay in the middle of the pixel in a mixed state.

At the same time, there are also attraction forces between the low positively charged red particles with high negatively charged yellow particles and between low negatively charged white particles with high positively charged black and mid positively charged blue particles. However, these attraction forces are not as strong as the attraction forces between two types of stronger charged black and yellow particles and between the blue and yellow particles, and therefore they can be overcome by the electric field generated by the low driving voltage. In other words, low charged particles and the high or mid charged particles of opposite polarity can be separated.

In addition, the electric field generated by the low driving voltage is sufficient to separate the low negatively charged white and the low positively charged red particles to cause the white particles to move to the common electrode side (i.e., the viewing side) and the red particles move to the pixel electrode side. As a result, a white color is seen. The red particles, in this case, are closest to the pixel electrode.

The low negative driving voltage may be applied as a single pulse as shown in FIG. 4a or 4b or a pulsing waveform as shown in FIG. 5a or 5b. The magnitude of the driving voltage in the pulsing waveform may be the same as, or different from, that of the single driving pulse. In the pulsing waveform, there may be 10-200 cycles of pulsing.

The driving method of FIG. 2-3 therefore can be summarized as follows:

A driving method for driving an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but their magnitude is lower than that of the second type of particles, the method comprises applying a driving voltage or a pulsing waveform of alternating a driving voltage and no driving voltage, to a pixel in the electrophoretic display, wherein the pixel is in the color state of the first type of particles and the driving voltage has the same polarity as the second and fifth types of particles to drive the pixel towards the color state of the fifth type of particles at the viewing side.

The driving voltage referred to in this method is a low negative driving voltage.

FIG. 2-4:

FIG. 2-4 shows how a blue color state (which is the color of the second highest positively charged particles) may be driven from the white state (which is the color of the lower negatively charged particles).

In one scenario, a medium positive driving voltage (e.g., +12V) is applied to a pixel of 2(d) in the white state. The voltage applied is not sufficient to separate the high positively charged black from the high negatively charged yellow particles, but sufficient to cause the mid positively charged blue particles to break away from the pack and move towards the viewing side. In this scenario, the high positively charged black particles will not be seen at the viewing side.

The low negatively charged white particles move away from the viewing side towards the pixel electrode side. When they pass the black and yellow particles, the electric field generated by the mid positive driving voltage of +12V is sufficient to separate the low negatively charged white particles from the high positively charged black particles. As a result, the white particles move to the pixel electrode side.

Similarly, the low positively charged red particles may be separated from the high negatively charged yellow particles and they move from the pixel electrode side to the common electrode side. However, because the blue particles have higher charge potential and move faster than the red particles, a high-quality blue color therefore can be seen at the viewing side.

This single pulse method with a medium positive driving voltage may lead to the blue color state, with proper timing. The driving time for the single pulse may be in the range of about 100 to about 2,000 msec. If the pulse is applied for too long, the red particles will catch up with the blue particles on the viewing side, which may cause some red tint appearing in the blue state.

Alternatively, the driving as shown in FIG. 2-4 may be achieved by a pulsing waveform as shown in FIG. 5a or 5b. The pulsing waveform has alternating 0V and a driving voltage. The driving voltage referred to has a magnitude which may or may not be the same as that of the driving voltage for the single pulse method. There may be 10-200 cycles of pulsing. The pulsing waveform may lead to better color performance because it can prevent aggregation of the blue particles with each other, which usually causes reduction of hiding power of the layers of the particles.

FIG. 2-5:

Alternatively, the blue state may also be achieved according to FIG. 2-5. A mid positive driving voltage (e.g., +8V) is applied to a pixel of 2(d) in the white state. The electric field generated by this driving voltage applied is also not sufficient to separate the high positively charged black from the high negatively charged yellow particles, but sufficient to cause the mid positively charged blue particles to break away from the pack and move towards the viewing side.

The red particles, as explained above, also move towards the common electrode side, but slower than the blue particles.

FIG. 2-5, however, introduces the possibility that the electric field generated by the driving voltage of +8V is not sufficient to separate the low negatively charged white particles from the high positively charged black particles. As a result, when the blue color state is seen at the viewing side, the non-viewing side may show a mixed color state of yellow, white and black.

This driving sequence may also be accomplished by a single pulse method as shown in FIG. 4(a) or 4(b) or a pulsing waveform of FIG. 5(a) or 5(b).

In either case, the driving method of FIGS. 2-4 and 2-5 can be summarized as follows:

A driving method for driving an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type have progressively lower magnitudes; and (d) the fifth type of particles carries the same charge polarity as the second type of particles but their magnitude is lower than that of the second type of particles, the method comprises applying a driving voltage or a pulsing waveform with alternating a driving voltage and no driving voltage, to a pixel in the electrophoretic display, wherein the pixel is in the color state of the fifth type of particles and the driving voltage has the same polarity as the first, third and fourth types of particles, to drive the pixel towards the color state of the third type of particles at the viewing side.

The driving voltage referred to in FIG. 2-4 or 2-5 is a medium positive driving voltage.

As shown in this example, there are three levels of positive driving voltage, high positive, medium positive and low positive, and two levels of negative driving voltage, high negative and low negative. The medium positive driving voltage may be 40% to 100%, preferably 50% to 90% of the high positive driving voltage and the low positive driving voltage may be 5% to 50%, preferably 15% to 40% of the high positive driving voltage. The low negative driving voltage may be 10% to 90%, preferably 30% to 70% of high negative driving voltage.

The above also applies to an embodiment wherein there are three levels of negative driving voltage, high negative, medium negative and low negative and two levels of positive driving voltage, high positive and low positive. The medium negative driving voltage may be 40% to 100%, preferably 40% to 90% of the high negative driving voltage and the low negative driving voltage may be 5% to 50%, preferably 10% to 45% of the high negative driving voltage. The low positive driving voltage may be 5% to 95%, preferably 25% to 75% of high positive driving voltage.

The "high" driving voltage (positive or negative) referred to above is usually the driving voltage required to drive a pixel from a color state of one type of the highest charged particles to a color state of another type of highest charged particles which are oppositely charged.

This embodiment of the present invention is directed to an electrophoretic display comprising a first surface on a viewing side, a second surface on a non-viewing side and an electrophoretic fluid sandwiched between a common electrode at the viewing side and a layer of pixel electrodes and comprising a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles, but their magnitude is lower than that of the second type of particles.

The first type, the third type and the fourth type of particles carry the same charge polarity and have progressively lower magnitudes, which means that the first type of particles has the highest charge magnitude, the fourth type of particles has the lowest charge magnitude and the third type of particles has a charge magnitude between the first and fourth types of particles.

The first and second types of particles may be black and white, or vice versa. Alternatively, the first and second types of particles may be black and yellow, or vice versa.

It is also possible that the first type of particles is black, the second type of particles is white, and the third, fourth and fifth types of particles are red, green and blue, respectively. Alternatively, the first type of particles is black, the second type of particles is yellow, and the third, fourth and fifth types of particles are blue, red and white, respectively. Alternatively, the first type of particles is black, the second type of particles is white, and the third, fourth and fifth types of particles are red, yellow and blue, respectively. Alternatively, the first type of particles is white, the second type of particles is black, and the third, fourth and fifth types of particles are red, yellow and blue, respectively.

The fluid may further comprise non-charged or slightly charged neutral buoyancy particles. In one embodiment, the neutral buoyancy particles are non-charged.

This embodiment of the invention is also directed to an electrophoretic display comprising a first surface on a viewing side, a second surface on a non-viewing side and an electrophoretic fluid sandwiched between a common electrode at the viewing side and a layer of pixel electrodes and comprising a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type have progressively lower magnitudes; and (d) the fifth type of particles carries the same charge polarity as the second type of particles, but their magnitude is lower than that of the second type of particles, and (i) application, to a pixel, of a high driving voltage having the same polarity as that of the first type of particles causes the pixel to show the color of the first type of particles at the viewing side and have the second type of particles at or near the pixel electrode;

(ii) application, to a pixel, of a high driving voltage having the same polarity as that of the second type of particles causes the pixel to show the color of the second type of particles at the viewing side and have the first type of particles at or near the pixel electrode;

(iii) application, to a pixel, of a low driving voltage having the same polarity as that of the fourth type of particles causes the pixel to show the color of the fourth type of particles at the viewing side and have the fifth type of particles at or near the pixel electrode; and (iv) application, to a pixel, of a low driving voltage having the same polarity as that of the fifth type of particles causes the pixel to show the color of the fifth type of particles at the viewing side and have the fourth type of particles at or near the pixel electrode.

The display may further comprise (v) application, to a pixel, of a mid-driving voltage having the same polarity as that of the third type of particles causes the pixel to show the color of the third type of particles at the viewing side and have the fifth type of particles or a mixture of the first, second and fifth types of particles, at or near the pixel electrode.

This embodiment of the invention is also directed to a driving method for driving an electrophoretic display as described above, the method comprises:

(i) applying, to a pixel, a high driving voltage having the same polarity as that of the first type of particles to cause the pixel to display the color of the first type of particles at the viewing side;

(ii) applying, to a pixel, a high driving voltage having the same polarity as that of the second type of particles to cause the pixel to display the color of the second type of particles at the viewing side;

(iii) applying, to a pixel, a low driving voltage having the same polarity as that of the fourth type of particles to cause the pixel to display the color of the fourth type of particles at the viewing side;

(iv) applying, to a pixel, a low driving voltage having the same polarity as that of the fifth type of particles to cause the pixel to display the color of the fifth type of particles at the viewing side; and (v) applying, to a pixel, a mid-driving voltage having the same polarity as that of the third type of particles to cause the pixel to display the color of the third type of particles at the viewing side.

The second embodiment of the first aspect of the invention is directed to a display device utilizing an electrophoretic fluid comprising five types of particles in which four types carry a charge polarity opposite from the charge polarity of the fifth type. In this aspect of the invention, the four types of particles may carry the positive charge and the fifth type carries the negative charge or the four types of particles may carry the negative charge and the fifth type carries the positive charge. The four types of like-charged particles have different levels of magnitude.

The following is an example illustrating this embodiment of the invention.

Example 2

In this example, the black and white particles carry the highest opposite charges. The black particles (K) (i.e., the first type) are positively charged and the white particles (W) (i.e., the second type) are negatively charged. The three types of colored particles, red (R) (i.e., the third type), green (G) (i.e., the fourth type) and blue (B) (i.e., the fifth type), are also positively charged and the black, red, green and blue particles have progressively lower magnitudes.

Since each type of particles has a distinguishable charge potential, there are different levels of attraction force between oppositely charged particles. FIG. 3 shows how five color states may be displayed.

FIG. 3-1:

In FIG. 3-1, a positive high driving voltage (e.g., +40V), is applied to a pixel of 3(a) in the white state; the high positively charged black particles move to be near or at the viewing side (i.e., the common electrode side), followed by the red, green and blue particles, to cause a black color to be seen in 3(b).

When a negative high driving voltage (e.g., −40V), is applied to the pixel as shown in 3(b), the negatively charged white particles move to be near or at the viewing side and as a result, a white color is seen in 3(a).

FIG. 3-2:

When a higher medium positive driving voltage (i.e., the second highest positive driving voltage) (e.g., +35V) is applied to a pixel of 3(a) in the white state, all the positively charged particles (black, red, green and blue) move towards the common electrode while the negatively charged white particles move towards the pixel electrode. However when they meet, the black and white particles become inseparable because of the attraction force between them. The electric field generated by the higher medium driving voltage is not sufficient to separate the black particles from the white particles. However, the electric field is sufficiently strong to free the red, green and blue particles and as a result, the red particles which are the second highest charged positive particles move to the common electrode at the viewing side. Therefore a red color is seen.

The green and blue particles also move towards the common electrode side; but because they are lesser charged, they move slower than the red particles.

FIG. 3-3:

When a lower medium positive driving voltage (i.e., the third highest positive driving voltage) (e.g., +25V) is applied to a pixel of 3(a) in the white state, all the positively charged particles (black, red, green and blue) move towards the common electrode while the negatively charged white particles move towards the pixel electrode. However when they meet, the black, red and white particles become inseparable because of the attraction forces between them. The electric field generated by the lower medium driving voltage is not sufficient to separate the black, red and white particles. However, the electric field is sufficiently strong to free the green and blue particles and as a result, the green particles which are the third highest charged positive particles move to the common electrode at the viewing side. Therefore a green color is seen.

The blue particles also move towards the common electrode side; but because they are lesser charged, they move slower than the green particles.

FIG. 3-4:

When a positive low driving voltage (i.e., the lowest positive driving voltage) (e.g., +15V) is applied to a pixel of 3(a) in the white state, all the positively charged particles (black, red, green and blue) move towards the common electrode while the negatively charged white particles move towards the pixel electrode. However when they meet, the black, red, green and white particles become inseparable because of the attraction forces between them. The electric field generated by the low driving voltage is not sufficient to separate the black, red, green and white particles. However, the electric field is sufficiently strong to free the blue particles and as a result, the blue particles which are positively charged move to the common electrode at the viewing side. Therefore a blue color is seen.

All of the driving sequences described in this example may be accomplished by a single pulse method as shown in FIG. 4(a) or 4(b) or a pulsing waveform as shown in FIG. 5(a) or 5(b).

The driving sequence of this embodiment of the invention may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of, all of which are dispersed in a solvent or solvent mixture, wherein:

(a) the five types of pigment particles have optical characteristics differing from one another;

(b) the first and second types of particles carry opposite charge polarities; and (c) the third, fourth and fifth types of particles carry the same charge polarity as the first type of particles and the first type, third type, fourth type and fifth type have progressively lower magnitudes; and the method comprises applying a driving voltage or a pulsing waveform with alternating a driving voltage and no driving voltage, to a pixel in the electrophoretic display, wherein the pixel is in the color state of the second type of particles and the driving voltage has the same polarity as the first, third, fourth and fifth types of particles, to drive the pixel to the color state of the third, fourth or fifth type of particles at the viewing side.

The magnitude of a higher medium driving voltage is 60% to about 100% of that of the high driving voltage. The magnitude of a lower medium driving voltage is 20% to about 70% of that of the high driving voltage. The magnitude of a low driving voltage is 5% to 50% of that of the high driving voltage. This applies to four levels of positive driving voltage as shown in this example and may also be applied to four levels of negative driving voltage.

The "high" driving voltage referred to above is usually the driving voltage required to drive a pixel from a color state of one type of highest charged particles to a color state of another type of highest charged particles which are oppositely charged.

This embodiment of the invention is directed to an electrophoretic display comprising a first surface on a viewing side, a second surface on a non-viewing side and an electrophoretic fluid sandwiched between a common electrode at the viewing side and a layer of pixel electrodes and comprising a first type of particles, a second type of particles, a third type of particles, a fourth type of particles and a fifth type of, all of which are dispersed in a solvent or solvent mixture, wherein:

(a) the five types of pigment particles have optical characteristics differing from one another;

(b) the first and second types of particles carry opposite charge polarities; and (c) the third, fourth and fifth types of particles carry the same charge polarity as the first type of particles and the first type, third type, fourth type and fifth type of particles have progressively lower magnitudes.

The first type, third type, fourth type and fifth type of particles carry the same charge polarity and have progressively lower magnitudes, which means that the first type of particles has the highest charge magnitude, the third type of particles has the second highest charge magnitude, the fourth type of particles has the third highest charge polarity and the fifth type of particles has the lowest charge magnitude.

The first and second types of particles may be black and white, or vice versa. The first and second types of particles may be black and yellow, or vice versa.

The first type of particles may be black, the second type of particles may be white, and the third, fourth and fifth types of particles may be red, green and blue, respectively. The first type of particles may be black, the second type of particles may be yellow, and the third, fourth and fifth types of particles may be blue, red and white, respectively. The first type of particles may be black, the second type of particles may be white, and the third, fourth and fifth types of particles may be red, yellow and blue, respectively. The first type of particles may be white, the second type of particles may be black, and the third, fourth and fifth types of particles may be red, yellow and blue, respectively.

The fluid may further comprise non-charged or slightly charged neutral buoyancy particles. The neutral buoyancy particles may be non-charged.

The second aspect of the present invention is directed to a display device utilizing an electrophoretic fluid comprising five types of particles and the colors are displayed because of different levels of mobility of the particles, in different driving voltage ranges.

In the first embodiment of this aspect of the invention, among the five types of particles, three types carry a charge polarity opposite from the charge polarity of the other two types. The following is an example illustrating this embodiment of the present invention.

Example 3

FIG. 6 illustrates particle mobility versus driving voltage of a system with three types of particles carrying the same charge polarity and two types of particles carrying opposite charge polarity.

As shown, in this example, the black (K), red (R) and green (G) particles are positively charged and the white (W) and blue (B) particles are negatively charged. It is noted that $Va$, $Vb$ and $Vc$ are positive and their magnitudes are $Va>Vb>Vc$, and $Vd$ and $Ve$ are negative and the magnitude of $Ve$ is greater than that of $Vd$.

Under a region of driving voltage of higher than $Va$, the black particles are the most mobile. In a voltage region between $Va$ and $Vb$, the red particles are the most mobile, and in a voltage region between $Vb$ and $Vc$, the green particles are the most mobile.

Also in FIG. 6, under a region of driving voltage of lower than $Ve$, the white particles are the most mobile. In a voltage region between $Vd$ and $Ve$, the blue particles are most mobile.

FIG. 7 shows how different color states may be displayed.

It is noted that for brevity, a band in FIGS. 7 and 9 indicates where a certain type of particles gathers. For example, a band marked W indicates where the white particles gather.

FIGS. 7-1 and 7-2:

When a driving voltage of greater than $Va$ is applied to a pixel of 7(a) in the white state, the black particles, being the most mobile at this driving voltage, would move the fastest to the common electrode side, followed by the red and green particles. This driving scheme may also start from the blue state or a mixed state of all particles.

It is worth noting that when the magnitude of the driving voltage (greater than $Va$) is higher than the magnitude of $Ve$, the white particles move the fastest to the pixel electrode side as shown in FIG. 7-1. However if the magnitude of the driving voltage (greater than $Va$) is between the magnitude of $Vd$ and $Ve$, the blue particles will move faster than the white particles to the pixel electrode side, as shown in FIG. 7-2.

FIG. 7-3:

When a driving voltage between $Va$ and $Vb$ is applied to a pixel of 7(a) in the white state, the red particles, being the most mobile at this driving voltage, would move the fastest to the common electrode side, followed by the green and black particles. This driving scheme may also start from the blue state or a mixed state of all particles.

Similarly as FIGS. 7-1 and 7-2, if the magnitude of the driving voltage (between $Va$ and $Vb$) is higher than the magnitude of $Ve$, the white particles will move the fastest to the pixel electrode side as shown in FIG. 7-3. However if the magnitude of the driving voltage (between $Va$ and $Vb$) is between the magnitude of $Vd$ and $Ve$, the blue particles will move faster than the white particles to the pixel electrode side (not shown).

FIG. 7-4:

When a driving voltage between $Vb$ and $Vc$ is applied to a pixel of 7(a) in the white state, the green particles being the most mobile at this driving voltage would move the fastest to the common electrode side, followed by the red and black particles. This driving scheme may also start from the blue state or a mixed state of all particles.

Similarly as FIGS. 7-1 and 7-2, if the magnitude of the driving voltage (between $Vb$ and $Vc$) is higher than the magnitude of $Ve$, the white particles will move the fastest to the pixel electrode side, as shown in FIG. 7-4. However if the magnitude of the driving voltage (between Vb and Vc) is between the magnitude of Vd and Ve, the blue particles would move faster than the white particles to the pixel electrode side (not shown).

FIG. 7-5:

When a driving voltage lower than Ve is applied to a pixel of 7(b) in the black state, the white particles being the most mobile at this driving voltage would move the fastest to the common electrode side, followed by the blue particles. This driving scheme may also start from the red, green or a mixed state of all particles.

As shown in FIG. 7-5, if the magnitude of the driving voltage (lower than Ve) is higher than the magnitude of Va, the stack of the particles at the pixel electrode side would be in the order of green, red and black, with the black particles closest to the pixel electrode. However, if the magnitude of the driving voltage (lower than Ve) is between the magnitude of Va and Vb, the stack of the particles at the pixel electrode side would be in the order of black, green and red, with the red particles closest to the pixel electrode. If the magnitude of the driving voltage (lower than Ve) is between the magnitude of Vb and Vc, the stack of the particles at the pixel electrode side would be in the order of black, red and green, with the green particles closest to the pixel electrode.

FIG. 7-6:

When a driving voltage between Vd and Ve is applied to a pixel of 7(b) in the black state, the blue particles being the most mobile at this driving voltage would move the fastest to the common electrode side, followed by the white particles. This driving scheme may also start from the red, green or a mixed state of all particles.

As shown in FIG. 7-6, if the magnitude of the driving voltage (between Vd and Ve) is higher than the magnitude of Va, the stack of the particles at the pixel electrode side would be in the order of green, red and black, with the black particles closest to the pixel electrode. However, if the magnitude of the driving voltage (between Vd and Ve) is between the magnitude of Va and Vb, the stack of the particles at the pixel electrode side would be in the order of black, green and red, with the red particles closest to the pixel electrode. If the magnitude of the driving voltage (between Vd and Ve) is between the magnitude of Vb and Vc, the stack of the particles at the pixel electrode side would be in the order of black, red and green, with the green particles closest to the pixel electrode.

Another embodiment of the second aspect of the invention is demonstrated in the following example.

Example 4

FIG. 8 illustrates particle mobility versus driving voltage of a system with four types of particles carrying the same charge polarity and the fifth type of particles carrying the opposite charge polarity. As shown, among the five types of particles, the black (K), red (R), green (G) and blue (B) particles are positively charged and the white (W) particles are negatively charged. Vf, Vg, Vh and Vi are all positive and their magnitudes are Vf>Vg>Vh>Vi.

In a voltage region higher than Vf, the black particles are the most mobile. In a voltage region between Vf and Vg, the red particles are the most mobile. In a voltage region between Vg and Vh, the green particles are the most mobile and in a voltage region between Vh and Vi, the blue particles are the most mobile.

FIG. 9 shows how five color states may be displayed.

FIG. 9-1:

When a driving voltage of higher than Vf is applied to a pixel of 9(a) in the white state, the black particles being the most mobile at this driving voltage would move the fastest to the common electrode side. As a result, a black color is seen at the viewing side.

The red particles will be underneath the black particles since they have the second highest mobility at this driving voltage. Because the black particles are opaque that has a good hiding power to block the light from penetrating them, the red particles cannot be seen from the viewing side. Similarly the green particles are under the red particles, and the blue particles are under the green particles. The white particles are at the opposite side (i.e., the non-viewing side) since they carry an opposite charge polarity.

It is also possible to start this driving sequence from a state where all five types of particles are mixed. The black color state may also be achieved by applying a driving voltage of higher than Vf. The mixed starting state may be achieved with a shaking waveform with the proper frequency and sufficient driving time.

FIG. 9-2:

When a driving voltage of between Vf and Vg is applied to a pixel of 9(a) in the white state, the red particles being the most mobile at this driving voltage would move the fastest to the common electrode side, followed by the green, blue and black particles. The black particles have the lowest mobility under this driving voltage. It is also possible to start this driving sequence from a mixed state of particles as discussed above.

FIG. 9-3:

When a driving voltage of between Vg and Vh is applied to a pixel of 9(a) in the white state, the green particles being the most mobile at this driving voltage would move the fastest to the common electrode side, followed by the blue, red and black particles. The black particles have the lowest mobility under this driving voltage. It is also possible to start this driving sequence from a mixed state of particles as discussed above.

FIG. 9-4:

When a driving voltage of between Vh and Vi is applied to a pixel of 9(a) in the white state, the blue particles being the most mobile at this driving voltage would move the fastest to the common electrode side, followed by the green, red and black particles. The black particles have the lowest mobility under this driving voltage. It is also possible to start this driving sequence from a mixed state of particles as discussed above.

FIG. 9-5:

When a negative driving voltage is applied to a pixel of any color state, the white particles move to the common electrode side (i.e., the viewing side) and all other types of particles move towards the pixel electrode side, and therefore a white color is seen. However, it is noted that the moving sequence of the four other types of particles is determined by the magnitude of the negative driving voltage. For example, if the magnitude is higher than Vf, the black pigments will be the closest to the pixel electrode. If the magnitude is between Vf and Vg, the red particles will be the closest to the pixel electrode, and so on. Since the white particles are opaque so the particles underneath will barely affect the visual quality of the white color state, from the viewing side. Therefore, it is not critical how the other types of particles are stacked at the non-viewing side.

These embodiments of the invention are directed to an electrophoretic display comprising a first surface on a viewing side, a second surface on a non-viewing side and an electrophoretic fluid comprising five types of particles dispersed in a solvent or solvent mixture, wherein at least one of the five types of particles carries a charge polarity opposite the charge polarity carried by the remaining types of particles, and the different types of particles have different levels of mobility in different driving voltage ranges.

Two of the five types of particles are black and white. Alternatively, at least one of the five types of particles is either black or white.

Among the five types of particles, three types of particles carry the same charge polarity and the remaining two types carry the opposite charge polarity. The three types of particles may be positively charged and the other two types of particles may be negatively charged. The five types of particles may be black, white red, green and blue, respectively or black, white, yellow, magenta and cyan, respectively, or black, white, yellow, magenta and blue, respectively or black, white, red, yellow and blue, respectively.

Among the five types of particles, four types of particles carry the same charge polarity and the fifth type of particles carries the opposite charge polarity. The four types of particles may be positively charged and the fifth type of particles may be negatively charged. The five types of particles may be black, white, red, green and blue, respectively or black, white, yellow, magenta and cyan, respectively, or black, white, yellow, magenta and blue, respectively or black, white, red, yellow and blue, respectively.

The fluid may further comprise substantially uncharged neutral buoyancy particles. The neutral buoyancy particles may be non-charged or slightly charged.

In all embodiments of the present invention, since the five color states are controlled by varying voltage levels and each particle type/color can occupy 100% of the pixel area at a particular driving voltage, brightness of each individual color state is not compromised. This type of full color EPD display will provide not only the non-compromising white and black states, but also non-compromising color states of other colors, such as red, green and blue.

As described, each of the pixels can display five color states. More color states may be displayed if a pixel consists of three sub-pixels and each of the sub-pixels, as described above, can display five color states. For example, one of the five color states may be displayed by the pixel if all three sub-pixels display that color. In addition, if the three sub-pixels display red, blue and black color states respectively, the pixel will be seen in a magenta color state. If the three sub-pixels display green, blue and black color states respectively, the pixel will be seen in a cyan color state. If the three sub-pixels display red, green and black color states respectively, the pixel will be seen in a yellow color state.

More color states may be displayed through adjusting driving waveforms or image processing.

The electrophoretic fluid as described above is filled in display cells. The display cells may be microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

FIG. 10 is a cross-section view of an array of display cells. As shown, the display cells (100) and the pixel electrodes (102a) do not have to be aligned. Each pixel (102) may display a color state depending on the driving voltage applied between the common electrode (101) and the corresponding pixel electrode (102a). However, because the display cells and the pixel electrodes are not aligned, a display cell may be associated with more than one pixel electrode, which leads to the possibility of a display cell displaying more than one color state, as shown.

The display device of the present invention, in addition to the common display applications, may also be used for decoration purposes, for example, in clothing and accessories (e.g., hats, shoes or wrist bands).

In a further aspect of the present invention, the fluid of the present invention may further comprise substantially uncharged neutral buoyancy particles.

The term "substantially uncharged" refers to the particles which are either uncharged or carry a charge which is less than 5% of the average charge carried by the higher charged particles. In one embodiment, the neutral buoyancy particles are non-charged.

The term "neutral buoyancy" refers to particles which do not rise or fall with gravity. In other words, the particles would float in the fluid between the two electrode plates. In one embodiment, the density of the neutral buoyancy particles may be the same as the density of the solvent or solvent mixture in which they are dispersed.

The concentration of the substantially uncharged neutral buoyancy particles in the display fluid is preferably in the range of about 0.1 to about 10% by volume, more preferably in the range of about 0.1 to about 5% by volume.

The term "about" refers to a range which is ±10% of the indicated value.

The substantially uncharged neutral buoyancy particles may be formed from a polymeric material. The polymeric material may be a copolymer or a homopolymer.

Examples of the polymeric material for the substantially uncharged neutral buoyancy particles may include, but are not limited to, polyacrylate, polymethacrylate, polystyrene, polyaniline, polypyrrole, polyphenol and polysiloxane. Specific examples of the polymeric material may include, but are not limited to, poly(pentabromophenyl methacrylate), poly(2-vinylnapthalene), poly(naphthyl methacrylate), poly(alpha-methystyrene), poly(N-benzyl methacrylamide) and poly(benzyl methacrylate).

More preferably, the substantially uncharged neutral buoyancy particles are formed from a polymer which is not soluble in the solvent of the display fluid, and also has a high refractive index. In one embodiment, the refractive index of the substantially uncharged neutral buoyancy particles is different from that of the solvent or solvent mixture in which the particles are dispersed. However, typically the refractive index of the substantially uncharged neutral buoyancy particles is higher than that of the solvent or solvent mixture. In some cases, the refractive index of the substantially uncharged neutral buoyancy particles may be above 1.45.

In one embodiment, the materials for the substantially uncharged neutral buoyancy particles may comprise an aromatic moiety.

The substantially uncharged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersant preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is polyethylene macromonomers, as shown below:

The backbone of the macromonomer may be a polyethylene chain and the integer "n" may be 30-200. The synthesis of this type of macromonomers may be found in Seigou Kawaguchi et al, Designed Monomers and Polymers, 2000, 3, 263.

If the fluid system is fluorinated, the dispersants are then preferably also fluorinated.

Alternatively, the substantially uncharged neutral buoyancy particles may also be formed from a core particle coated with a polymeric shell and the shell may be formed, for example, from any of the polymeric material identified above.

The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher, or the like.

In the case of core-shell substantially uncharged neutral buoyancy particles, they may be formed by a microencapsulation method, such as coacervation, interfacial polycondensation, interfacial cross-linking, in-suit polymerization or matrix polymerization.

The size of the substantially uncharged neutral buoyancy particles is preferably in the range of about 100 nanometers to about 5 microns.

In one embodiment of this aspect of the present invention, the substantially uncharged neutral buoyancy particles added to the fluid may have a color substantially the same visually to the color of one of the five types of charged particles. For example, in a display fluid, there may be charged white, black, red, green and blue particles and substantially uncharged neutral buoyancy particles, and in this case, the substantially uncharged neutral buoyancy particles may be white, black, red, green or blue.

In another embodiment, the substantially uncharged neutral buoyancy particles may have a color substantially different from the color of either one of the five types of charged particles.

The presence of the substantially uncharged neutral buoyancy particles in the fluid increases reflection of incident light, thus also improving the contrast ratio, especially if they are formed from a reflective material.

The image stability may also be improved by the addition of the substantially uncharged neutral buoyancy particles in the five particle fluid system. The substantially uncharged neutral buoyancy particles can fill in the gaps resulted from the charged particles being over packed on the surface of an electrode under an electrical field, thus preventing the charged particles from settling due to the gravitational force.

In addition, if the substantially uncharged neutral buoyancy particles are white, they may enhance the reflectivity of the display. If they are black, they may enhance the blackness of the display.

In any case, the substantially uncharged neutral buoyancy particles do not affect the driving behavior of the five types of charged particles in the fluid.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display comprising a first surface on a viewing side, a second surface on a non-viewing side, and an electrophoretic fluid sandwiched between a common electrode at the viewing side and a layer of pixel electrodes at the non-viewing side; the electrophoretic fluid comprising a first type of particles, a second type of particles, a third type of particles, a fourth type of particles and a fifth type of particles, all of which are dispersed in a solvent or solvent mixture, wherein:
   (a) the five types of pigment particles have optical characteristics differing from one another;
   (b) the first and second types of particles carry opposite charge polarities;
   (c) the third and fourth types of particles carry the same charge polarity as the first type of particles, and the first type, the third type and the fourth type of particles have progressively lower magnitudes; and
   (d) the fifth type of particles carries the same charge polarity as the second type of particles, but their magnitude is lower than that of the second type of particles; and
   wherein application, to a pixel, of a mid-driving voltage causes a mixture of the particles of the first type and second type to stay in middle of the pixel and causes the particles of the third type to break away from the mixture and move at or near the viewing side; and
   wherein the application of the mid-driving voltage further causes the particles of the fifth type to break away from the mixture and move at or near the pixel electrode.

2. The display of claim 1, wherein the first and second types of particles are black and white, or vice versa.

3. The display of claim 1, wherein the first and second types of particles are black and yellow, or vice versa.

4. The display of claim 2, wherein the first type of particles is black, the second type of particles is white, and the third, fourth and fifth types of particles are red, green and blue, respectively.

5. The display of claim 3, wherein the first type of particles is black, the second type of particles is yellow, and the third, fourth and fifth types of particles are blue, red and white, respectively.

6. The display of claim 2, wherein the first type of particles is black, the second type of particles is white, and the third, fourth and fifth types of particles are red, yellow and blue, respectively.

7. The display of claim 2, wherein the first type of particles is white, the second type of particles is black, and the third, fourth and fifth types of particles are red, yellow and blue, respectively.

8. The display of claim 1, wherein the fluid further comprises non-charged or slightly charged neutral buoyancy particles.

9. The display of claim 8, wherein the neutral buoyancy particles are non-charged.

10. An electrophoretic display comprising a first surface on a viewing side, a second surface on a non-viewing side and an electrophoretic fluid sandwiched between a common electrode at the viewing side and a layer of pixel electrodes at the non-viewing side; the electrophoretic fluid comprising a first type of particles, a second type of particles, a third type of particles, a fourth type of particles and a fifth type of particles, all of which are dispersed in a solvent or solvent mixture, wherein:
 (a) the five types of pigment particles have optical characteristics differing from one another;
 (b) the first and second types of particles carry opposite charge polarities;
 (c) the third and fourth types of particles carry the same charge polarity as the first type of particles, and the first type, the third type and the fourth type have progressively lower magnitudes; and
 (d) the fifth type of particles carries the same charge polarity as the second type of particles, but their magnitude is lower than that of the second type of particles; and
 (i) application, to a pixel, of a first high driving voltage having the same polarity as that of the first type of particles causes the pixel to show the color of the first type of particles at the viewing side and have the second type of particles at or near the pixel electrode, wherein the first high driving voltage causes the particles of the third type to stay near the viewing side and below the particles of the first type and causes the particles of the fourth type to stay near the viewing side and below the particles of the third type;
 (ii) application, to a pixel, of a second high driving voltage having the same polarity as that of the second type of particles causes the pixel to show the color of the second type of particles at the viewing side and have the first type of particles at or near the pixel electrode, wherein the second high driving voltage causes the particles of the fifth type to stay near the viewing side and below the particles of the second type;
 (iii) application, to a pixel, of a first low driving voltage having the same polarity as that of the fourth type of particles causes the pixel to show the color of the fourth type of particles at the viewing side and have the fifth type of particles at or near the pixel electrode, wherein the particles of the first, second and third types stay in middle of the pixel in a mixed state as the first low driving voltage is not strong enough to overcome attraction forces between the particles of the first, second and third; and
 (iv) application, to a pixel, of a second low driving voltage having the same polarity as that of the fifth type of particles causes the pixel to show the color of the fifth type of particles at the viewing side and have the fourth type of particles at or near the pixel electrode, wherein the particles of the first, second and third types stay in middle of the pixel in a mixed state as the second low driving voltage is not strong enough to overcome attraction forces between the particles of the first, second and third.

11. The display of claim 10, further comprising
 (v) application, to a pixel, of a mid-driving voltage having the same polarity as that of the third type of particles causes the pixel to show the color of the third type of particles at the viewing side and have the fifth type of particles or a mixture of the first, second and fifth types of particles, at or near the pixel electrode.

12. A driving method for driving an electrophoretic display of claim 1, the method comprises applying a driving voltage or a pulsing waveform of alternating a driving voltage and no driving voltage, to a pixel in the electrophoretic display, wherein the pixel is in the color state of the second type of particles and the driving voltage has the same polarity as the first, third and fourth types of particles to drive the pixel towards the color state of the fourth type of particles at the viewing side.

13. The method of claim 12, wherein the driving voltage is a low driving voltage.

14. A driving method for driving an electrophoretic display of claim 1, the method comprises applying a driving voltage or a pulsing waveform of a driving voltage and no driving voltage, to a pixel in the electrophoretic display, wherein the pixel is in the color state of the first type of particles and the driving voltage has the same polarity as the second and fifth types of particles to drive the pixel towards the color state of the fifth type of particles at the viewing side.

15. The method of claim 14, wherein the driving voltage is a low driving voltage.

16. A driving method for driving an electrophoretic display of claim 1, the method comprises applying a driving voltage or a pulsing waveform of alternating a driving voltage and no driving voltage, to a pixel in the electrophoretic display, wherein the pixel is in the color state of the fifth type of particles and the driving voltage has the same polarity as the first, third and fourth types of particles to drive the pixel towards the color state of the third type of particles at the viewing side.

17. The method of claim 16, wherein the driving voltage is a mid-driving voltage.

18. A driving method for driving an electrophoretic display of claim 1, the method comprises:
 (i) applying, to a pixel, a high driving voltage having the same polarity as that of the first type of particles to cause the pixel to display the color of the first type of particles at the viewing side;
 (ii) applying, to a pixel, a high driving voltage having the same polarity as that of the second type of particles to cause the pixel to display the color of the second type of particles at the viewing side;
 (iii) applying, to a pixel, a low driving voltage having the same polarity as that of the fourth type of particles to cause the pixel to display the color of the fourth type of particles at the viewing side;
 (iv) applying, to a pixel, a low driving voltage having the same polarity as that of the fifth type of particles to cause the pixel to display the color of the fifth type of particles at the viewing side; and
 (v) applying, to a pixel, a mid-driving voltage having the same polarity as that of the third type of particles to cause the pixel to display the color of the third type of particles at the viewing side.

19. An electrophoretic display comprising a first surface on the viewing side, a second surface on the non-viewing side and an electrophoretic fluid which fluid is sandwiched between a common electrode and a layer of pixel electrodes at the non-viewing side; the electrophoretic fluid comprising a first type of particles, a second type of particles, a third type of particles, a fourth type of particles and a fifth type of, all of which are dispersed in a solvent or solvent mixture, wherein:

(a) the five types of pigment particles have optical characteristics differing from one another;
(b) the first and second types of particles carry opposite charge polarities; and
(c) the third, fourth and fifth types of particles carry the same charge polarity as the first type of particles and the first type, third type, fourth type and fifth type of particles have progressively lower magnitudes; and wherein application, to a pixel, of a higher medium driving voltage causes a mixture of the particles of the first type and the second type to stay in middle of the pixel and causes the particles of the third type to break away from the mixture and move at or near the viewing side.

20. The display of claim 19, wherein application, to a pixel, of a lower medium driving voltage causes a mixture of particles of the first, second, and third types to stay in middle of the pixel and causes the particles of the fourth type to break away from the mixture and move at or near the viewing side;

wherein application, to a pixel, of a low driving voltage causes a mixture of particles of the first, second, third, and fourth types to stay in middle of the pixel and causes the particles of the fifth type to break away from the mixture and move at or near the viewing side; and wherein the higher medium driving voltage is higher than the lower medium driving voltage, and the lower medium driving voltage is higher than the low driving voltage.

* * * * *